(12) United States Patent
Umbehocker

(10) Patent No.: US 9,141,289 B2
(45) Date of Patent: Sep. 22, 2015

(54) INTELLIGENT DATA STORAGE UTILIZING ONE OR MORE RECORDS

(75) Inventor: Steven Michael Umbehocker, Mercer Island, WA (US)

(73) Assignee: OS NEXUS, INC., Mercer Island, WA (US)

( * ) Notice: Subject to any disclaimer, the term of this patent is extended or adjusted under 35 U.S.C. 154(b) by 867 days.

(21) Appl. No.: 12/749,998

(22) Filed: Mar. 30, 2010

(65) Prior Publication Data

US 2011/0246734 A1    Oct. 6, 2011

(51) Int. Cl.
*G06F 12/00* (2006.01)
*G06F 3/06* (2006.01)
*G06F 13/00* (2006.01)
*G06F 13/28* (2006.01)
*G06F 11/14* (2006.01)

(52) U.S. Cl.
CPC ............ *G06F 3/0608* (2013.01); *G06F 3/065* (2013.01); *G06F 3/067* (2013.01); *G06F 3/0641* (2013.01); *G06F 3/0604* (2013.01); *G06F 11/1464* (2013.01)

(58) Field of Classification Search
CPC ...... G06F 3/0641; G06F 3/0604; G06F 3/067
USPC ............................ 711/162, 154; 707/610, 697
See application file for complete search history.

(56) References Cited

U.S. PATENT DOCUMENTS

| | | | |
|---|---|---|---|
| 6,216,209 B1 * | 4/2001 | Cadden et al. | 711/154 |
| 6,944,732 B2 * | 9/2005 | Thunquest et al. | 711/162 |
| 7,366,859 B2 * | 4/2008 | Per et al. | 711/162 |
| 7,421,551 B2 * | 9/2008 | Desai et al. | 711/162 |
| 7,529,973 B2 * | 5/2009 | Matsui | 714/20 |
| 8,214,612 B1 * | 7/2012 | Natanzon | 711/162 |
| 2004/0260899 A1 * | 12/2004 | Kern et al. | 711/162 |
| 2005/0114338 A1 * | 5/2005 | Borthakur et al. | 707/9 |
| 2005/0204108 A1 | 9/2005 | Ofek et al. | |
| 2006/0236029 A1 | 10/2006 | Corrado et al. | |
| 2007/0022144 A1 | 1/2007 | Chen | |
| 2008/0120488 A1 | 5/2008 | Woo et al. | |
| 2010/0057860 A1 | 3/2010 | Fry et al. | |
| 2010/0070724 A1 * | 3/2010 | Ito et al. | 711/162 |
| 2010/0077165 A1 * | 3/2010 | Lu et al. | 711/162 |

OTHER PUBLICATIONS

International Search Report and Written Opinion mailed on Apr. 19, 2011 for International Application No. PCT/US2011/026633, 12 pages.

* cited by examiner

*Primary Examiner* — Mark Giardino, Jr.
(74) *Attorney, Agent, or Firm* — Amin, Turocy & Watson, LLP

(57) ABSTRACT

Systems, methods, and apparatus for facilitating intelligent data storage utilizing one or more records are presented herein. A write component of a storage medium can receive data and write one or more portions of the data to a storage block of the storage medium. Further, a signature component of the storage medium can create a record within the storage medium, and update at least one part of the record corresponding to the storage block based on the one or more portions of the data. Moreover, a query component of the storage medium can receive a request and transmit the record based on the request; and transmit one or more attributes of the storage medium based on another request. Furthermore, the signature component can update the at least one part of the record based on whether content of the storage block changed as a function of the write.

24 Claims, 24 Drawing Sheets

INTELLIGENT DATA STORAGE UTILIZING ONE OR MORE RECORDS

TECHNICAL FIELD

This disclosure relates generally to data storage including, but not limited to, intelligent data storage utilizing one or more records.

BACKGROUND

Conventional data storage techniques rely on data backup and/or replication solutions to recover lost data. For example, conventional remote device(s) and/or system(s) perform replication and/or backup of data stored in a storage device by reading data from each storage element of the storage device and copying the data to another remote, storage device. In another example, conventional device(s) and/or system(s) copy the data to the remote storage device via a network, such as a local area network or a wide area network.

In yet another example, conventional data storage techniques copy the data to the remote storage device based on whether the data has changed. Such techniques determine whether the data has changed, e.g., by remotely computing a signature of data of each storage element of the storage device utilizing one or more algorithms, and copying the data of the storage element to the remote storage device if the signature of the data has changed.

One concern with conventional data storage techniques is that data throughput of a storage device, and/or an associated interface coupled to the storage device, limits a rate at which the storage device is backed-up and/or replicated, i.e., via the associated interface. Under ideal data throughput conditions, data can be moved from a large storage device to a remote storage device, e.g., via a wide area network, at a rate of 10 Gbits/sec; however, under non-ideal data throughput conditions, data is currently moved from the large storage device to the remote storage device at a rate of 10 Mbits/sec. During such non-ideal throughput conditions, data backup and/or replication can take hours, days, or even weeks to complete via the wide area network.

Although conventional data storage techniques, for example, compute the signature of data of each storage element of a storage device to assist replication and/or backup of the storage device, such techniques require calculating and/or communicating the data signature of each storage element of the storage device during a backup and/or replication of the storage device—consuming time, consuming network bandwidth, consuming processing resources, etc.

The above-described deficiencies of today's data storage environments and related technologies are merely intended to provide an overview of some of the problems of conventional technology, and are not intended to be exhaustive. Other problems with the state of the art, and corresponding benefits of some of the various non-limiting embodiments described herein, may become further apparent upon review of the following detailed description.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the subject disclosure. Its sole purpose is to present some concepts of the disclosed subject matter in a simplified form as a prelude to the more detailed description presented later.

To correct for the above identified deficiencies of today's data storage environments and other drawbacks of conventional storage environments, various systems, methods, and apparatus described herein utilize one or more storage records included in an intelligent data storage medium.

For example, a storage medium can include a write component configured to receive data; and write one or more portions of the data to a storage block of the storage medium; and a signature component configured to create a record within the storage medium; and update at least one part of the record corresponding to the storage block based on the one or more portions of the data.

In another example, a method can include storing data in one or more storage blocks of a storage medium; maintaining, by the storage medium, a record within the storage medium corresponding to the one or more storage blocks; and updating, by the storage medium, the record based on the maintaining.

In yet another example, an apparatus can include means for storing data in a storage device; means for maintaining, by the storage device, a record within the storage device corresponding to the data; and means for updating, by the storage device, the record based on the means for the maintaining.

In one example, a method can include copying one or more storage blocks from a storage medium to another storage medium; iteratively receiving, from the storage medium, one or more records during the copying; and iteratively updating the copying of the one or more storage blocks based on the one or more records.

In another example, a system can include an application component configured to request a storage medium to transmit records corresponding to one or more storage blocks of the storage medium via a communications protocol; compare, via a comparison, a record of the records with an other record of the records; and determine whether at least one storage block of the one or more storage blocks changed based on the comparison. Further, the system can include an interface component configured to interface with the storage medium, based on the request, via at least one of an in-band command set associated with the communications protocol or an out-of-band command set associated with the communications protocol.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
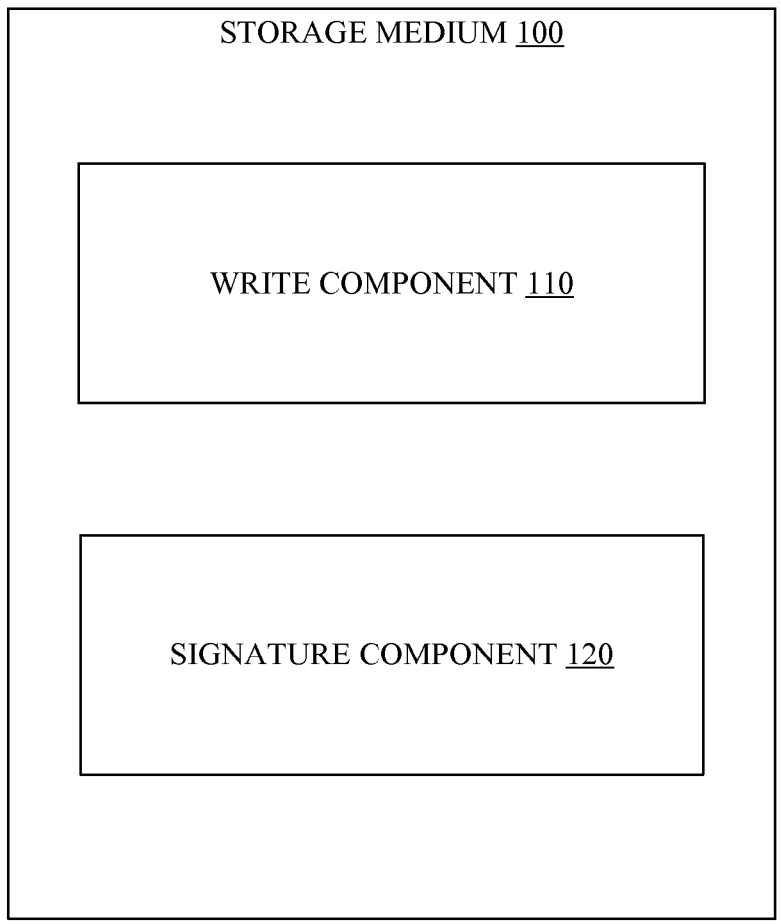
FIG. 1 illustrates a block diagram of a storage medium, in accordance with an embodiment.

Various non-limiting embodiments of systems, methods, and apparatus presented herein utilize one or more storage records included in an intelligent data storage medium.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via signature component 120 (see below), to automatically update record(s) of a storage system and/or automatically calculate signature(s) of storage block (s) associated with the record(s), e.g., to enable de-duplication of the storage block(s).

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

Although conventional data storage techniques remotely replicate and/or back up data of a storage device, such techniques impact user experience negatively, e.g., under non-ideal data throughput conditions associated with one or more networks coupled to the storage device. Further, although conventional data storage techniques compute data signatures to assist storage device replication and/or backup, such techniques require calculating and/or communicating the data signature of each storage element of the storage device during a backup and/or a replication of the storage device.

As described above, conventional data storage techniques reduce user experience by consuming time, network bandwidth, and/or processing resources, e.g., by calculating and/or communicating data signatures of each data block of a storage device during a backup and/or replication of the storage device. Compared to such technology, various systems, methods, and apparatus described herein in various embodiments can improve user experience(s) by utilizing one or more storage records included in an intelligent data storage medium.

Referring now to FIG. 1, a block diagram of a storage medium 100 is illustrated, in accordance with an embodiment. Aspects of storage medium 100, and systems, networks, other apparatus, and processes explained herein can constitute machine-executable instructions embodied within machine(s), e.g., embodied in one or more computer readable mediums (or media) associated with one or more machines. Such instructions, when executed by the one or more machines, e.g., computer(s), computing device(s), virtual machine(s), etc. can cause the machine(s) to perform the operations described.

Additionally, the systems and processes explained herein can be embodied within hardware, such as an application specific integrated circuit (ASIC) or the like. Further, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Storage medium 100 can include a write component 110 and signature component 120. Furthermore, storage medium 100 can include various computer-based storage technologies including, e.g., a Small Computer System Interface (SCSI), which is a peripheral, peer-to-peer interface that can be used, e.g., in personal computer (PC) server systems; a Serial Storage Architecture (SSA); a SCSI-over-Fiber Channel Protocol; Serial Attached SCSI (SAS); an Internet SCSI (iSCSI), which is an Internet Protocol (IP) based storage networking standard for linking data storage facilities and/or entities; virtual storage, e.g., associated with virtual machines of a cloud computing system; at least one solid state disk (SSD) device; etc.

In an aspect, storage medium 100 can include virtual hard disk device (VHD) file(s), physical SCSI device(s), Serial Advanced Technology Attachment (SATA) device(s), SAS device(s), and/or SSD device(s). In another aspect, storage medium 100 can employ such device(s) and/or virtual disk device(s), e.g., utilizing SCSI, iSCSI, Fibre Channel (FC), SCSI-over-Fiber Channel, SSA, AT-Attachment interface (ATA), ATA over Ethernet (AoE), other Storage Area Network (SAN) protocol(s), etc.

In yet another aspect, storage medium 100 can receive information and/or data, e.g., via write component 110, via query component 310 (see below); transmit data, e.g., via query component 310 (see below); or transmit/receive data within, e.g., a cloud computing system, a remote storage system, a storage appliance, a storage network, etc. via front-end port(s), e.g., Ethernet port(s), a SATA computer bus, a SCSI interface, an iSCSI interface, a SAS interface, an FC interface, an ATA interface, an AoE interface, etc. For example, storage medium 100 can utilize an iSCSI interface to receive and transmit data over local area network(s) (LAN(s)), wide area network(s) (WAN(s)), and/or the Internet; and can enable location-independent data storage and retrieval.

Under iSCSI protocol, clients (or initiators), can send SCSI commands to SCSI storage device(s) (or target(s)), e.g., storage medium 100. As such, the SCSI storage device can be located on or within remote servers. Furthermore, iSCSI can be used to consolidate computer storage into data center storage arrays, while enabling, for example, host(s), database server(s), web server(s), computational server(s), etc. to appear as locally-attached resources, e.g., acting as virtual machines within a cloud computing system. For example, storage system 100 can be included within a cloud computing system, e.g., implemented as a virtual machine of the cloud computing system, implemented as a solid state storage device referenced by the cloud computing system, etc.

In one aspect, write component 110 can be configured to write one or more portions of the data to a storage block (not shown) of storage medium 100. The storage block can include at least one bit and be partitioned into various size blocks, e.g., of one or more bytes, etc. Further, signature component 120 can be configured to create a record (not shown) within storage medium 100. For example, the record can include a one-dimensional array, a multi-dimensional array, an index, a file, a database, etc. forming part of storage medium 100. Moreover, signature component 120 can be configured to update at least one part of the record corresponding to the storage block of storage medium 100 based on the one or more portions of data stored in the storage block, e.g., via write component 110.

In an aspect, signature component 120 can atomically update the at least one part of the record after a write operation, e.g., after writing/storing one or more portions of data to/in the storage block, for example, regardless of whether content of the storage block changed based on the write operation. In one aspect, signature component 120 can include a monitor component (not shown) that can determine whether one or more portions of data were stored in the storage block. In another aspect, the monitor component can determine whether content of the storage block changed as a function of a write performed on the storage block, e.g., based on whether the at least one part of the record changed as a result of atomically updating the at least one part of the record. In yet another aspect, signature component 120 can update the at least one part of the record, e.g., a bitmap, by setting or clearing a bit of the bitmap if data is written to, or stored in, a storage block corresponding to the bit of the bitmap. In yet another aspect, signature component 120 can set or clear the bit of the bitmap if content of the storage block changed as a function of a write performed on the storage block.

Figure 2:
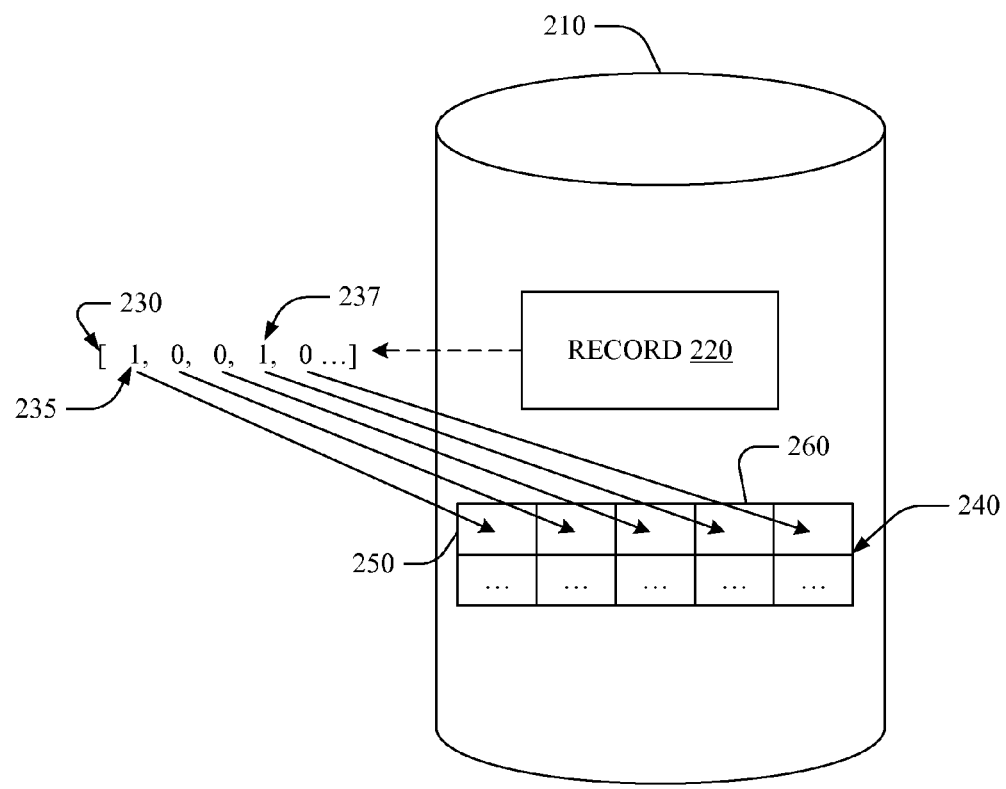
FIG. 2 illustrates a block diagram of a storage medium associated with one or more records, in accordance with an embodiment.

For example, in an aspect illustrated by FIG. 2, storage medium 210 can include write component 110 and signature component 120 (both not shown), and a record 220 including a bitmap 230, or one-dimensional array, which includes at least one bit associated with each storage block of storage medium 210. As illustrated by FIG. 2, bits 235 and 237 of bitmap 230 have been set to a logic 1 via signature component 120; indicating data was written to/stored in storage block 250 and storage block 260 of storage blocks 240, respectively. In another aspect (not shown), signature component 120 can clear a bit of bitmap 230, e.g., set the bit to a logic 0, to indicate data was written to/stored in a storage block of storage blocks 240.

In other aspect(s), signature component 120 can indicate data was stored in a storage block of storage blocks 240 by setting an associated bit in bitmap 230 to a logic 0. Further, signature component 120 can indicate data was stored in the storage block by setting the bit to a logic 1. As described below, a cloud computing system, a remote storage system, a storage appliance, a storage network, etc. can use a record, e.g., bitmap 230, to determine whether to transfer and/or replace data from/to a storage medium, e.g., storage medium 210, during a backup procedure, a replication procedure, an antivirus scanning procedure, etc.

Figure 3:
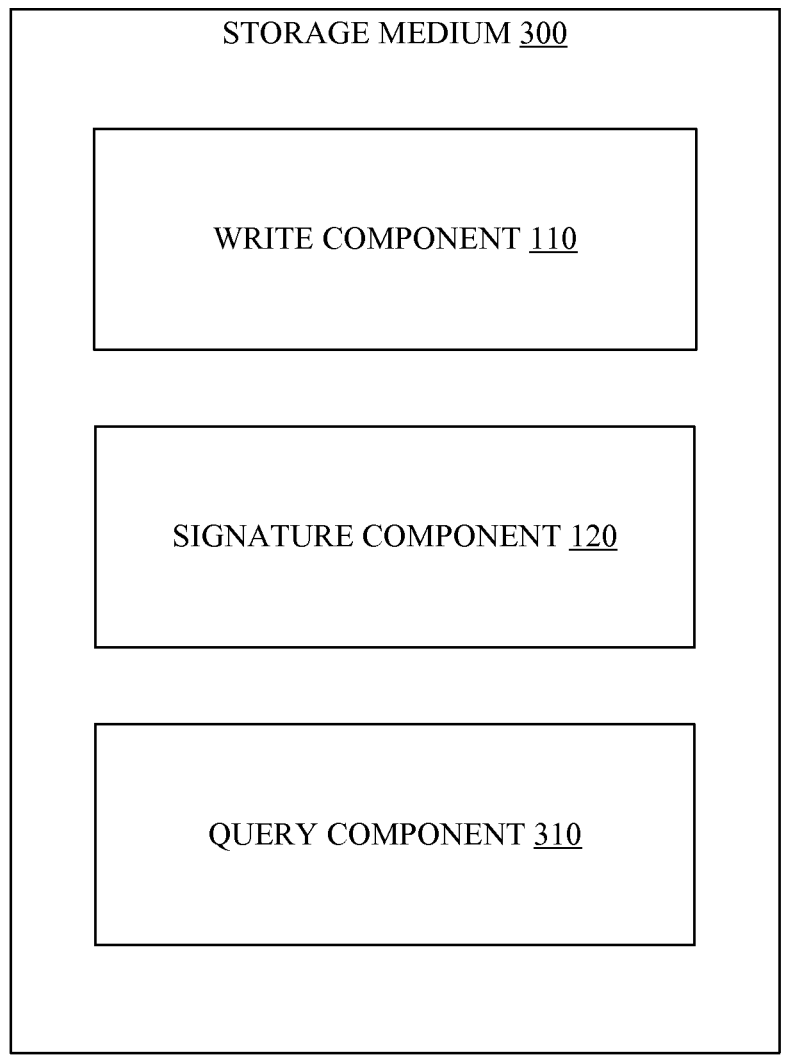
FIG. 3 illustrates another block diagram associated with a storage medium, in accordance with an embodiment.
Figure 4:
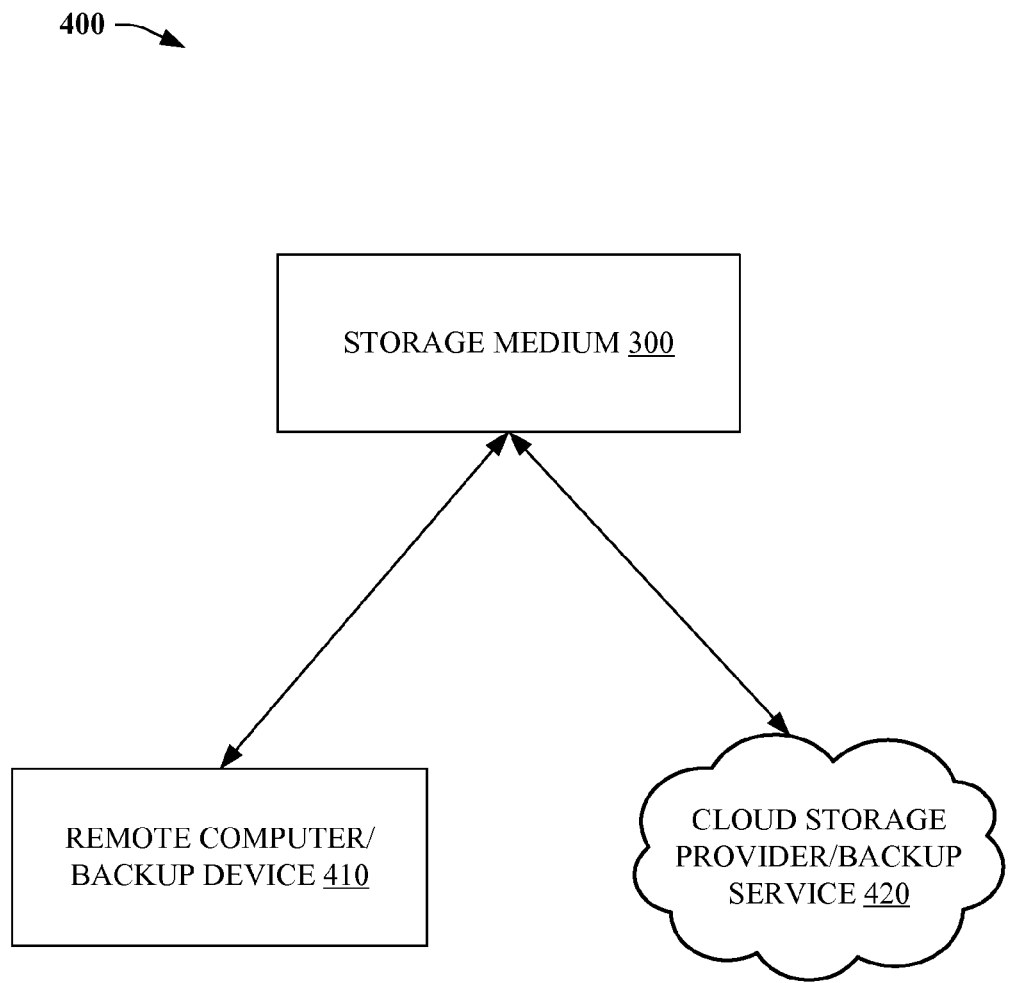
FIG. 4 illustrates a storage related environment, in accordance with an embodiment.
Figure 5:
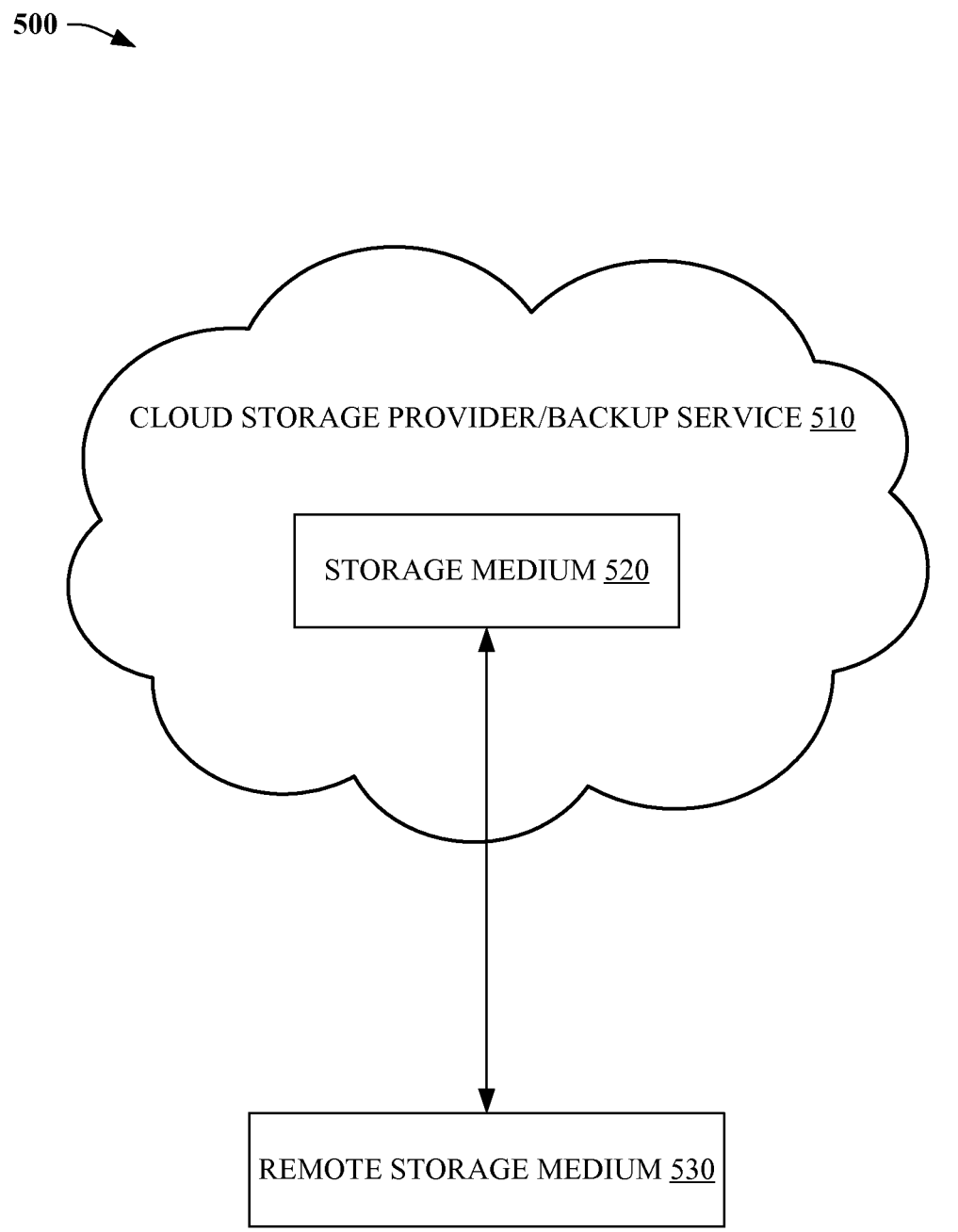
FIG. 5 illustrates another storage related environment, in accordance with an embodiment.

Referring now to FIGS. 3-5, a storage medium 300, a storage medium 520 (included in a cloud storage provider/backup service 510), and a remote storage medium 530 can include write component 110, signature component 120, and an query component 310. Correspondingly, query component 310 can be configured to receive, e.g., via front-end port(s) (see above), a request from and/or within a storage related entity, e.g., a remote computer/backup device 410, a cloud storage provider/backup service 420, a storage medium 520, a remote storage medium 530, a storage related entity 1400 (see below), etc. In an aspect, the request can include a request to transmit the record, e.g., record 220, of a storage medium, e.g., storage medium 100, 210, 300, 520, 530, etc. to the storage related entity. Further, query component 310 can be configured to transmit the record to the storage related entity based on the request.

As described above, data throughput of a storage device, and/or an associated interface coupled to the storage device, can limit a rate at which the storage device can be backed-up and/or replicated. To correct for these and other deficiencies of conventional storage techniques, storage medium(s) 100, 210, 300, 520, 530, etc. can, e.g., limit the transfer of data during backup and/or replication procedures by maintaining one or more records, e.g., record 220, indicating whether one or more blocks of data of an associated storage medium have been "touched," changed, and/or written to, e.g., via write component 110. Accordingly, a storage related entity, e.g., 410, 420, 510, 1400 (see below), etc. can query, at different times, a storage medium, e.g., 100, 210, 300, 520, 530, etc. to request the storage medium to transmit, e.g., via query component 310, one or more records associated with one or more blocks of data of the storage medium.

For example, the storage related entity can be associated with a software application, a hardware application, a vendor, etc. and the one or more records can be associated with different software applications, hardware applications, vendors, etc. Further, the storage related entity can determine which storage blocks have been touched, changed, and/or written to, based on record(s) received from the storage medium that is/are associated with the storage related entity. For example, the storage related entity can request a transfer—during a backup procedure, a replication procedure, an antivirus scanning procedure, etc. associated with the query—of storage blocks determined to have been touched, changed, and/or written to before the backup procedure, the replication procedure, the antivirus scanning procedure, etc. was initiated, e.g., resulting in conservation of valuable bandwidth during such procedures.

Further, as described above, conventional data storage techniques can require calculating and/or communicating a data signature of each storage element of a storage device during backup and/or replication of the storage device, e.g., consuming time, consuming network bandwidth, consuming processing resources, etc. To correct for these and other deficiencies of conventional storage techniques, storage medium (s) 100, 210, 300, 520, 530, etc. can, e.g., improve data throughput and/or reduce loading of storage related entity computational resources by calculating data signatures of storage blocks of the storage medium(s). As such, signature component 120 can be configured to calculate a signature of a storage block of storage medium 100 based on one or more portions of the data. For example, signature component 120 can be configured to calculate the signature of the storage block utilizing at least one of a hash algorithm, a message digest algorithm, a secure hash algorithm (SHA), an SHA-1, an SHA-2, a message-digest algorithm 5 (MD5), etc. computed over the one or more portions of the data. In an aspect, signature component 120 can be configured to atomically calculate and store, e.g., in one or more records, the signature of the storage block corresponding to write component 110 writing and/or storing information to/in the storage block.

Moreover, signature component 120 can be configured to store the signature in one or more records, e.g., record 220, of storage medium 100, 210, 300, 520, 530, etc. In one aspect (not shown), the one or more records can include a map, e.g., a one-dimensional array, a multi-dimensional array, a table, a file, a database, etc. of one or more signatures, or block signature(s), e.g., a map of block signatures, calculated via signature component 120—each signature corresponding to a storage block of storage medium 100, 210, 300, 520, 530, etc. As such, a storage related entity, e.g., 410, 420, 510, 1400 (see below), etc. can query a storage medium, e.g., 100, 210, 300, 520, 530, etc. at different times—requesting the storage medium to transmit one or more maps associated with the storage related entity during each query.

Accordingly, the storage related entity can determine which storage blocks were touched, changed, and/or written to—between consecutive queries—by determining which signatures of the map changed between the consecutive queries. As such, the storage related entity can request a transfer, e.g., during a backup procedure, a replication procedure, an antivirus scanning procedure, etc. associated with the query of storage blocks determined to have been touched, changed, and/or written to before such procedure was initiated, e.g., resulting in conservation of valuable network bandwidth and/or storage related entity computing resources during backup, replication, antivirus scanning, etc. procedures.

Figure 6:
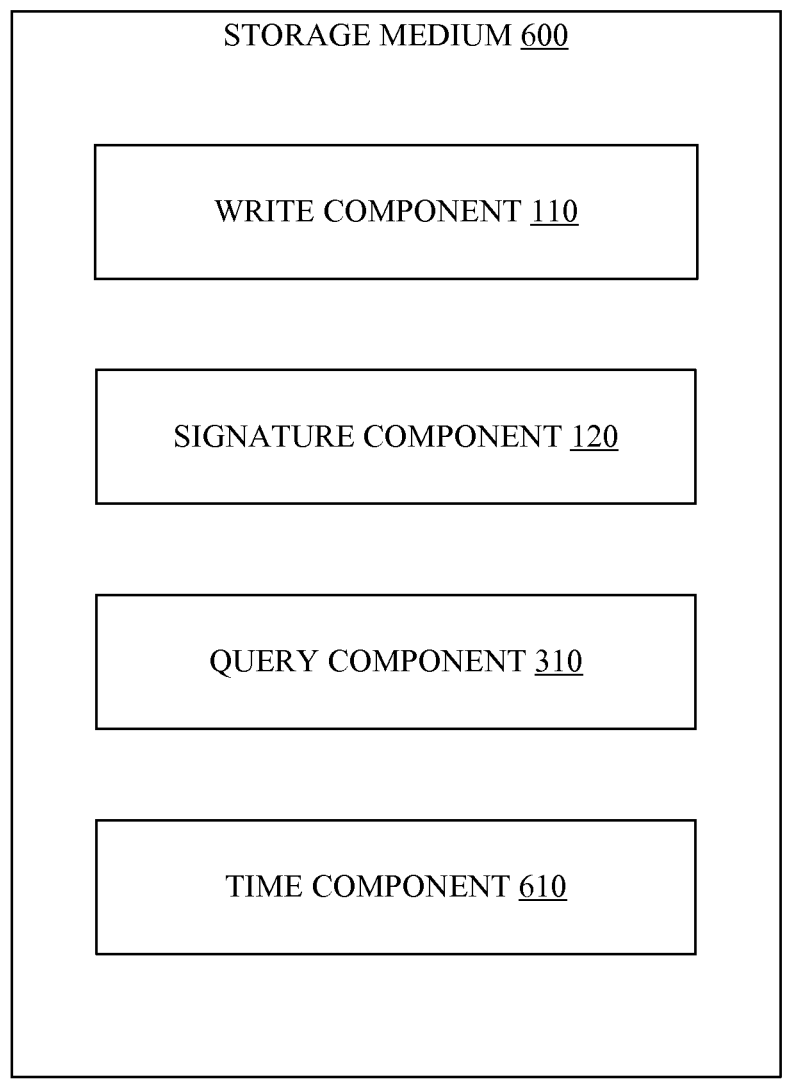
FIG. 6 illustrates a storage medium including a time component, in accordance with an embodiment.

Referring now to FIG. 6, a storage medium 600 including a time component 610 is illustrated, in accordance with an embodiment. Time component 610 can be configured to update a record with a time corresponding to a write, e.g., via write component 110, of one or more portions of data to a storage block of storage medium 600. In one aspect (see, e.g., FIG. 7), the record can include a log indicating a time that a specific storage block was touched, changed, and/or written to, e.g., via write component 110. For example, the log can associate an address of a block, or an offset of the block from another storage block and/or reference point of storage medium 600, with a time that the block was touched, changed, and/or written to, e.g., via write component 110.

Figure 7:
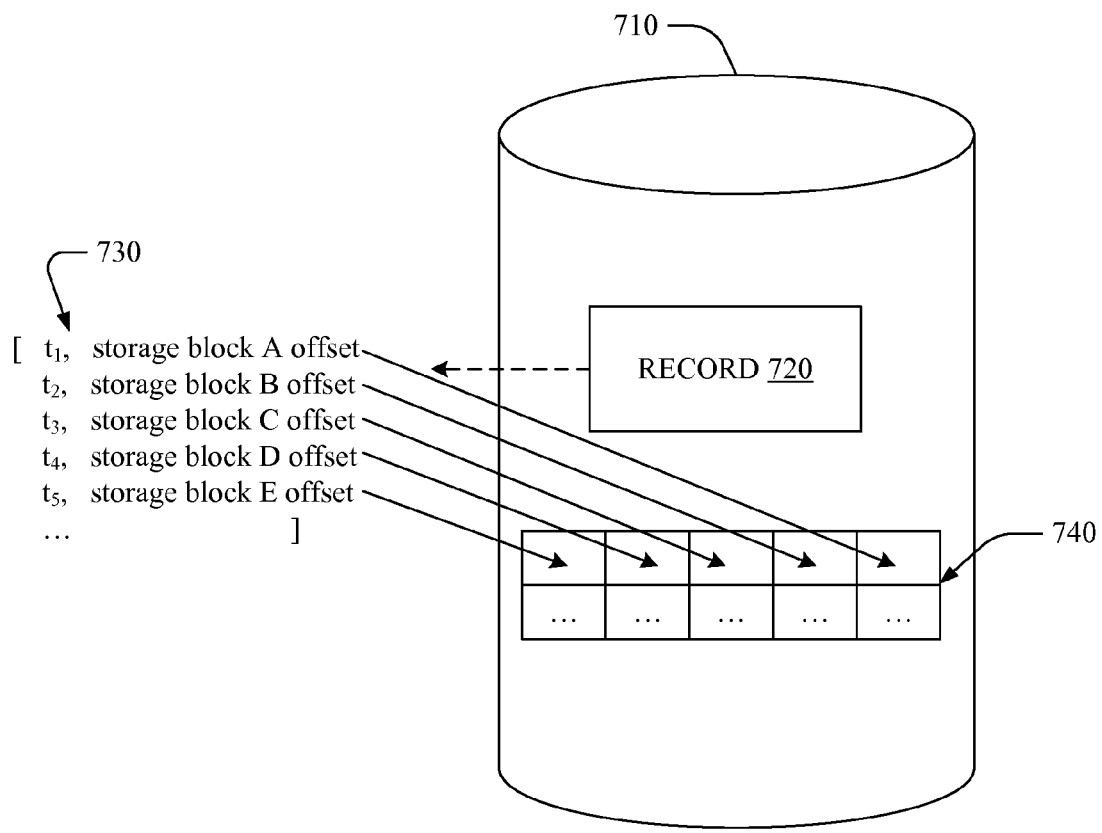
FIG. 7 illustrates another storage medium including a time component, in accordance with an embodiment.

As illustrated by FIG. 7, a record 720 of a storage medium 710 can include a log 730, in accordance with an embodiment. Log 730 can be a chronological listing associating times $t_1$-$t_5$ with writes made, e.g., via write component 110, to storage blocks A-E of storage blocks 740. In an aspect illustrated by FIG. 7, storage block offsets from a common reference point and/or a storage block of storage medium 710 can be included in log 730, which can associate storage blocks A-E with times $t_1$-$t_5$. In another aspect, log 730 can include a chronological listing of touches and/or changes made to block(s) of storage blocks 740. Accordingly, various applications can utilize log 730, e.g., for enabling effective restart of disrupted storage backup procedure(s), replication procedure(s), antivirus scanning procedure(s), etc.

For example, if backup/replication/antivirus-scanning of a storage medium, e.g., storage medium 600, 710, etc. is interrupted, e.g., due to a natural disaster and/or an equipment failure, a storage related entity, e.g., 410, 420, 510, 1400 (see below), etc. can query the storage medium after the backup/replication was interrupted, e.g., by requesting the storage medium to transmit a log, e.g., log 730, including a chronological list identifying writes made to one or more blocks of the storage medium. As such, the storage related entity can resume backup/replication/antivirus-scanning, e.g., at a time prior to a last entry of the log.

In another aspect, the storage related entity can query the storage medium, e.g., 100, 210, 300, 520, 530, 600, etc. at different times—requesting the storage medium to transmit one or more logs, e.g., log 730, associated with the storage related entity during each query. Accordingly, the storage related entity can determine which storage blocks were touched, changed, and/or written to between consecutive queries by comparing logs returned by the consecutive queries. As such, the storage related entity can request a transfer, during a backup and/or replication procedure associated with the query, of storage blocks determined to have been touched, changed, and/or written to before the backup and/or replication procedure was initiated, e.g., resulting in conservation of valuable network bandwidth and/or storage related entity computing resources during backup and/or replication procedures.

Figure 8:
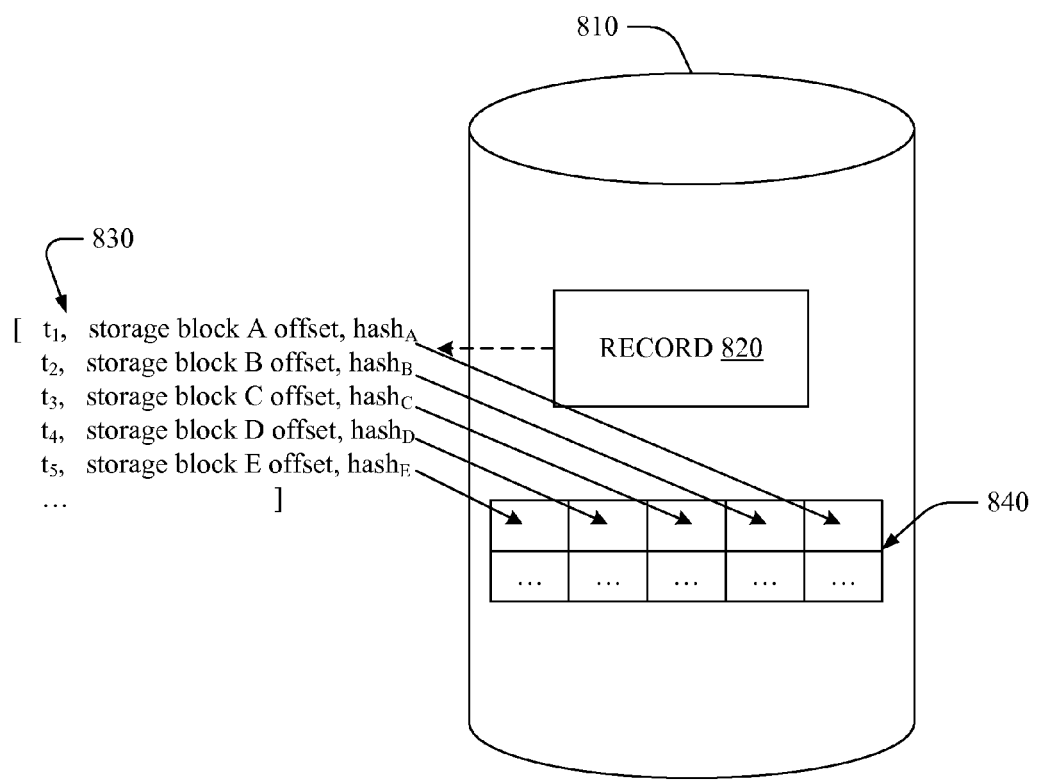
FIG. 8 illustrates yet another storage medium including a time component, in accordance with an embodiment.

In yet another aspect, a storage medium, e.g., storage medium 600, 710, 810 (see below), etc. can be configured to calculate a signature of a storage block, e.g., of storage blocks 740. In one aspect, the storage medium can be configured to calculate the signature of the storage block utilizing at least one of a hash algorithm, a message digest algorithm, a secure hash algorithm (SHA), an SHA-1, an SHA-2, a message-digest algorithm 5 (MD5), etc. computed over one or more portions of data stored in the storage block. Further, the storage medium can be configured to store, e.g., via write component 110, the signature in a record, e.g., a log of block signatures, associating the signature with the storage block. For example, in an embodiment illustrated by FIG. 8, a record 820 of a storage medium 810 can include a log 830 that can be a chronological listing associating times $t_1$-$t_5$ with writes made, e.g., via write component 110, to storage blocks A-E of storage blocks 840, and associating the writes with signatures of related storage blocks, e.g., $hash_A$-$hash_E$.

As such, a storage related entity, e.g., 410, 420, 510, 1400 (see below), etc. can query the storage medium at different times—requesting the storage medium to transmit one or more logs, e.g., log 830, associated with the storage related entity during each query. Accordingly, the storage related entity can determine which storage blocks were touched, changed, and/or written to between consecutive queries by comparing logs returned by the consecutive queries, e.g., by utilizing and/or comparing signatures associated with storage blocks. Thus, the storage related entity can request a transfer, during a backup and/or replication procedure associated with the query, of storage blocks determined to have been touched, changed, and/or written to before the backup and/or replication procedure was initiated.

In another aspect (not illustrated), a storage medium, e.g., storage medium 600, 710, 810, etc. can be configured to employ de-duplication based on one or more records maintained by the storage medium. For example, a monitor component (see above) can monitor a record including signatures of storage blocks of the storage medium. When data stored in different storage blocks is the same, signatures stored in different records associated with the different storage blocks are equivalent. Correspondingly, the storage medium can monitor, e.g., via the monitor component, signatures stored in different records to determine whether two or more storage blocks associated with the different records store equivalent information. As such, the storage medium can utilize a pointer to reference a common storage block without storing duplicative data in the storage medium. For example, the storage medium can conserve storage space, e.g., cache memory, etc. by storing one copy of duplicative storage block data in the cache memory, and associating pointers that reference the one copy with other storage blocks associated with the duplicative data—conserving storage space by storing pointers to reference common data instead of storing duplicative copies of the common data.

Figure 9:
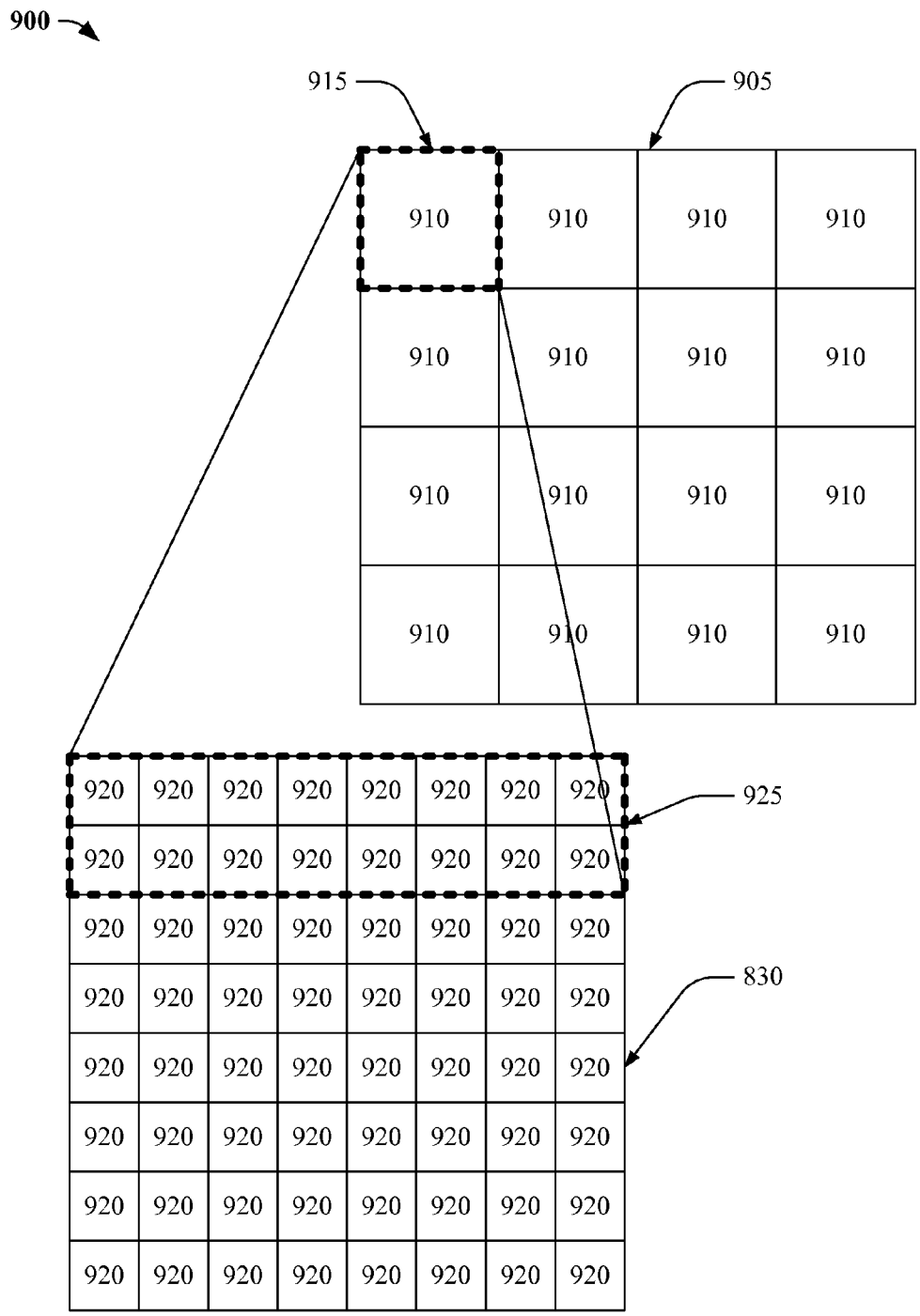
FIG. 9 illustrates a record including a signature of multiple signatures, in accordance with an embodiment.

Now referring to FIG. 9, records 900 are illustrated, in accordance with an embodiment. In an aspect, a storage medium, e.g., storage medium 600, 710, 810, etc. can be configured to calculate a signature based on the signatures of multiple storage blocks. In one aspect, the storage medium can be configured to calculate the signature of the signatures utilizing at least one of a hash algorithm, a message digest algorithm, a secure hash algorithm (SHA), an SHA-1, an SHA-2, a message-digest algorithm 5 (MD5), etc. computed over the signatures. For example, the storage medium can be configured to calculate the signature of a signature, e.g., a hash of a hash, utilizing SHA-1. Further, the storage medium can be configured to store, e.g., via write component 110, the hash of the hash in a record. In an aspect illustrated by FIG. 9, the storage medium can be configured to calculate a signature, e.g., hash key 910, over multiple signatures, e.g., hash keys 920, associated with storage blocks of the storage medium.

For example, the storage medium can be configured to calculate a SHA 256-byte hash key 915 over multiple hash keys 925, e.g., over 16 SHA 256-byte hash keys, e.g., $hash_A$, $hash_B$, etc. associated with 64k-byte storage blocks of the storage medium and stored in log 830 of record 820. Moreover, the storage medium can be configured to store hash key 915 in a record 905. Accordingly, a storage related entity, e.g., 410, 420, 510, 1400 (see below), etc. can determine which storage blocks were touched, changed, and/or written to—between consecutive queries by (1) determining which signatures of record 905 changed between the consecutive queries and (2) determining which signatures of corresponding signatures 925 changed between the consecutive queries. In this way, maintaining a signature of multiple signatures in a record can enable a storage related entity to more efficiently determine whether storage blocks of the storage medium have been touched, changed, and/or written to between queries.

Referring again to FIG. 3, in one aspect, query component 310 can be configured to receive, e.g., via front-end port(s) (see above), a request from and/or within a storage related entity, e.g., a remote computer/backup device 410, a cloud storage provider/backup service 420, a storage medium 520, a remote storage medium 530, etc. including a request to transmit one or more attributes of a storage medium, e.g., 100, 210, 300, 520, 530, 600, 710, etc. to the storage related entity. Further, query component 310 can be configured to transmit the one or more attributes of the storage medium to the storage related entity based on the request. The storage related entity can utilize the attributes via, e.g., a backup procedure, a replication procedure, an antivirus-scanning procedure, etc. to configure such procedure(s) to effectively interface with the storage medium.

For example, the one or more attributes of the storage medium can include information associated with at least one of: a type of data intelligence of the storage medium, e.g., whether the storage medium supports and/or maintains a bitmap, a map of block signatures, a log, or a log of block signatures; a size of storage block(s) of the storage medium, e.g., a fixed and/or logical block size by which raw device data is divided into and addressed within the storage medium; one or more hash, or message digest, algorithm(s), e.g., SHA-1, SHA-2, MD5, etc. utilized by the storage medium; a maximum hash/message digest/signature length; a minimum hash/message digest/signature length; one or more version(s) of the hash/message digest/signature algorithm(s); a record, e.g., a log, a map, a map of block signatures, a map of a map (e.g., hash map of a hash map table, record 905, etc.); a size of the record; a hash key/digest/signature for a specified storage block; a number of hash keys, e.g., 925, referred to by another hash key, e.g., 915; a portion of the record based on a specified range of the record; or a portion of the storage block(s) based on a specified range of the storage block(s).

Figure 10:
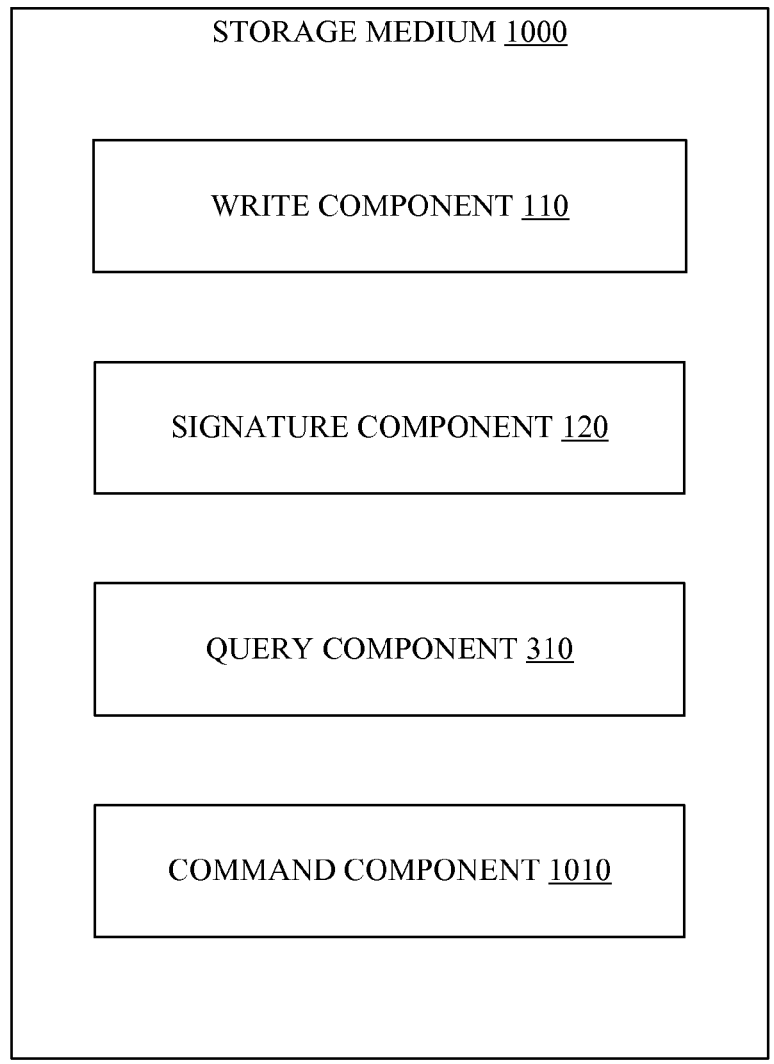
FIG. 10 illustrates a storage medium including a command component, in accordance with an embodiment.

Referring now to FIG. 10, a storage medium 1000 including a command component 1010 is illustrated, in accordance with an embodiment. Command component 1010 can be configured to at least one of transmit information from storage medium 1000 or receive information at storage medium 1000, e.g., via write component 110 and/or query component 310, based on an extension of an in-band device command set (not shown), e.g., a command set associated with extensions of standard commands of at least one of a SCSI protocol, an iSCSI protocol, an FC protocol, a SCSI-over-Fiber Channel protocol, an SSA protocol, an ATA protocol, an ATA over Ethernet (AoE) protocol, other SAN protocol(s), etc. For example, storage medium 1000 can receive data via write component 110, receive requests via query component 310, transmit records via query component 310, and transmit attributes via query component 310 utilizing extension(s) of an in-band device command set associated with one or more of the SAN protocols.

Figure 11:
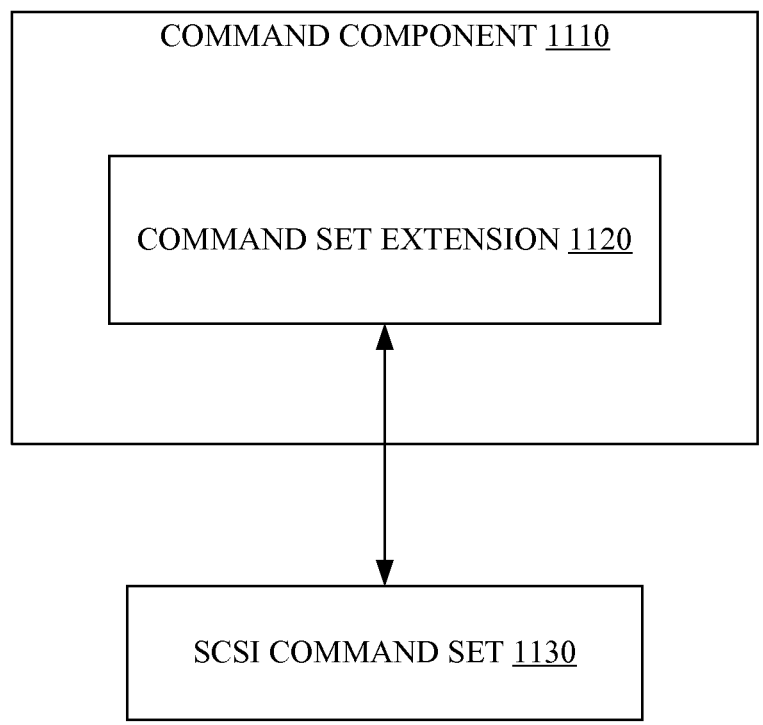
FIG. 11 illustrates a command component, in accordance with an embodiment.

In aspect illustrated by FIG. 11, a command component 1110 can include a command set extension component 1120, in accordance with an embodiment. As illustrated, command set extension component 1120 can interface with, or extend, a SCSI command set 1130, e.g., enabling storage medium 1100 to receive data via write component 110, receive requests via query component 310, transmit records via query component 310, and transmit attributes via query component 310 utilizing extension(s) of SCSI command set 1130. In other aspects (not shown), command set extension component 1120 can interface with, or extend, one or more of the SAN protocols described above. In this way, storage medium 1100 can improve associated storage related entity interfaces and/or reduce storage related entity computing resources, e.g., since associated hardware vendors are not required to standardize their out-of-band proprietary network interfaces to perform, e.g., storage medium operations described herein via write component 110, via query component 310, via query component 310, etc.

In another aspect, command component 1010 can be configured to at least one of transmit information from storage medium 1000 or receive information at storage medium 1000, e.g., via write component 110 and/or query component 310, based on a standardized, out-of-band device command set (not shown). For example, command component 1010 can be configured to transmit and/or receive information via the out-of-band command set based on a standardized application programming interface (API) (not shown) implemented via a storage related entity, e.g., remote computer/backup device 410, cloud storage provider/backup service 420, cloud storage provider/backup service 510, storage medium 520, remote storage medium 530, 1400 (see below), etc. communicating with storage medium 1000.

Figure 12:
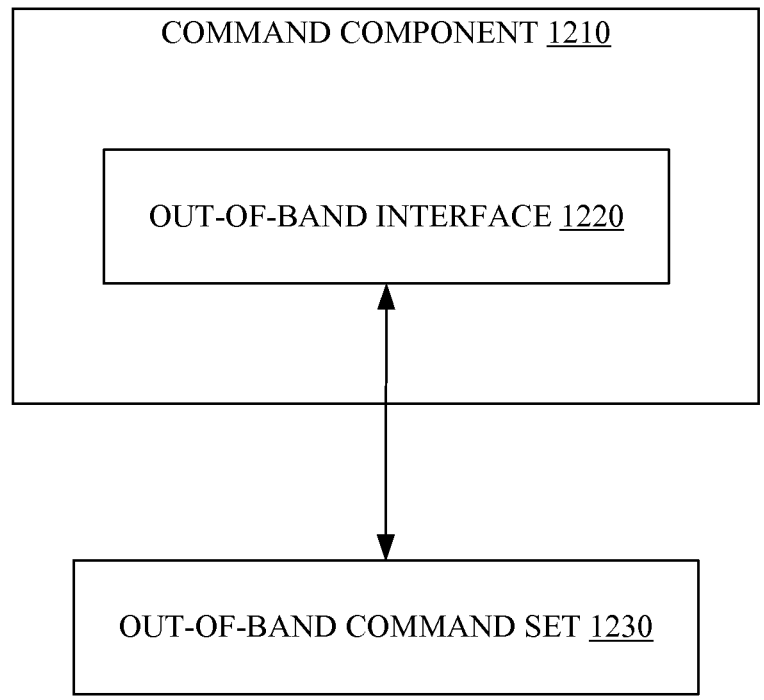
FIG. 12 illustrates another command component, in accordance with an embodiment.

For example, in an aspect illustrated by FIG. 12, a command component 1210 can include an out-of-band interface component 1220 that can interface with an out-of-band command set 1230 via the standardized API. As such, the standardized API can specify an identification of a storage medium (e.g., 1000, 1430, etc.), e.g., a mode page descriptor if the storage medium is configured as a SCSI device. Further, the standardized API can specify context of processes/methods associated with the storage medium—enabling a storage related entity to interface with the storage medium utilizing the standardized API.

In another aspect, an API implemented via a storage related entity, e.g., 410, 420, 510, 1400 (see below), etc. can be associated with an in-band and/or an out-of-band command set and used by the storage related entity to at least one of: return information, e.g., attributes, of a storage medium including: information of record(s), e.g., 720, 820, 905, etc. stored and/or maintained in the storage medium; hash algorithm(s) utilized by the storage medium; version(s) of such hash algorithms; a size of records(s), hash maps, and/or logs associated with the storage medium; a size (or length) of hash key(s)/message digest(s)/signature(s) utilized by the storage medium; a size of hashed storage blocks; a number of signatures referred to by another signature via the storage medium, e.g., via a hash of hashes; or a state of the storage medium, e.g., "normal", "busy", "initializing", "offline", "error", etc.

In yet another aspect, the API implemented via the storage related entity can be associated with an in-band and/or an out-of-band command set, and used by the storage related entity to return at least one of: storage block size(s) supported by a storage medium, e.g., 100, 210, 300, 520, 530, 600, 710, 810, 1000, 1300, 1430, etc.; hash/message digest/signature algorithm(s) supported by the storage medium; maximum digest/signature length; minimum digest/signature length; a hash key/message digest/signature of a specified storage block of the storage medium; hash key(s)/message digest(s)/signature(s) for all storage blocks of the storage medium; a number of signatures referred to by another signature via the storage medium, e.g., via a hash of hashes; a size of record(s), hash maps, and/or logs of the storage medium; or hash key (s)/message digest(s)/signature(s) for each storage block in a specified range of storage blocks of the storage medium.

Figure 13:
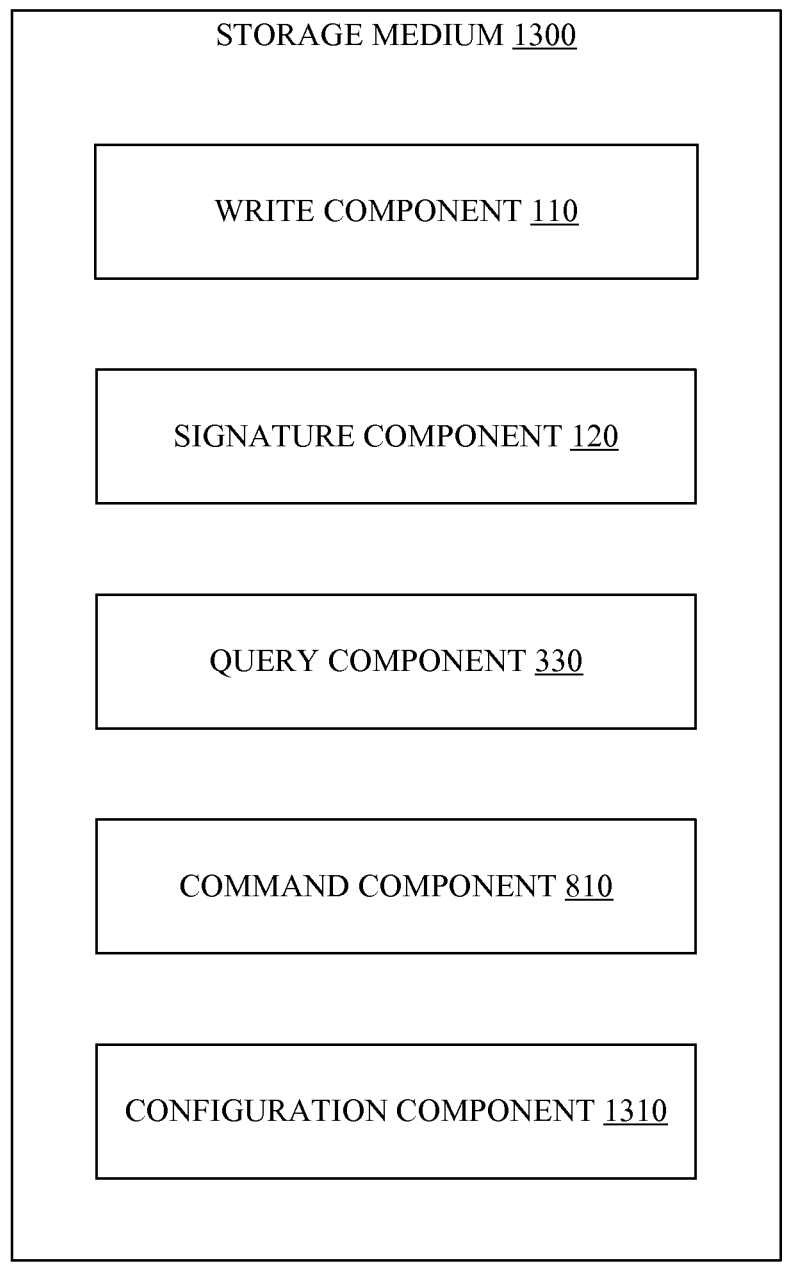
FIG. 13 illustrates a storage medium including a configuration component, in accordance with an embodiment.

Now referring to FIG. 13, a storage medium 1300 including a configuration component 1310 is illustrated, according to an embodiment. Configuration component 1310 can be configured to receive a configuration request, e.g., from a storage related entity (see above). Further, configuration component 1310 can be configured to change a configuration of storage medium 1300 based on the configuration request. For example, the storage related entity can utilize an API, which can be associated with an in-band or an out-of-band command set, to query storage medium 1300 attributes, capabilities, and/or information (see above). As such, the storage related entity can change the configuration of storage medium 1300 by communicating the configuration request to storage medium 1300, e.g., via an API associated with the in-band or the out-of band command set. For example, the storage related entity can select among hash/message digest/signature algorithm(s) supported by storage medium 1300, based on the configuration request.

Figure 14:
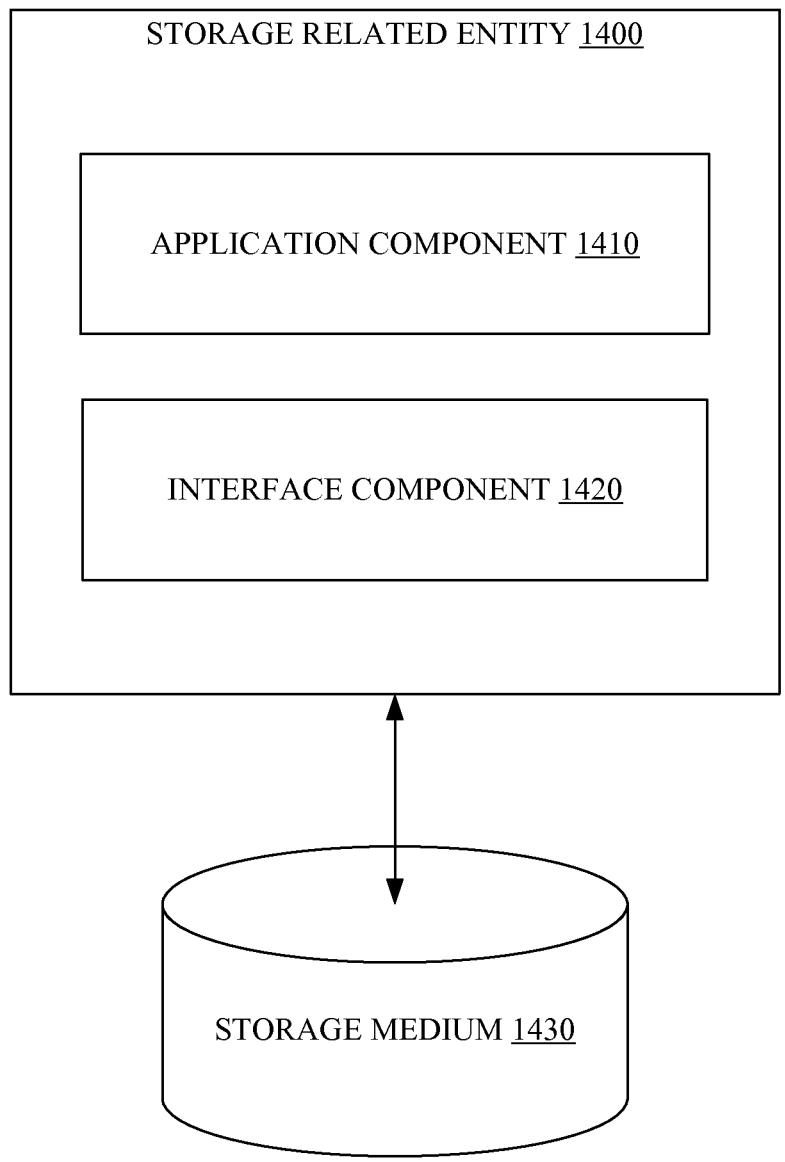
FIG. 14 illustrates a storage related entity, in accordance with an embodiment.

FIG. 14 illustrates a storage related entity 1400, in accordance with an embodiment. Storage related entity 1400 can include an application component 1410 and an interface component 1420. Further, storage related entity 1400, e.g., 410, 420, 510, etc. can control, interface with, etc. a storage medium 1430, e.g., 100, 210, 300, 520, 530, 600, 710, 810, 1000, 1300, etc. For example, application component 1410 can include one or more applications related to performing at least one of the following operations: a backup of storage medium 1430; a replication of storage medium 1430; a fault recovery of storage medium 1430; or antivirus-based operations related to storage medium 1430. As such, application component 1410 can utilize one or more records stored via storage medium 1430 to perform such operations.

For example, application component 1410 can include a backup application that can iteratively request storage medium 1430 to transmit one or more records, e.g., bitmap(s), log(s), etc. to storage related entity 1400 after backup application initiates a backup operation of storage medium 1430. The backup application can iteratively compare one or more parts of the one or more records, based on the transmission requests, during one or more backup procedures to determine whether one or more portions of data associated with storage block(s) related to the one or more records changed between requests to transmit the one or more records, e.g., while the backup application performed the backup operation.

In one example, application component 1410 can include a replication application that can enable storage related entity 1400 to copy and/or maintain a copy of storage medium 1430. The replication application can request storage medium 1430 to transmit one or more records, e.g., bitmap(s), log(s), etc. to storage related entity 1400, and can identify whether one or more portions of data associated with storage block(s) related to the one or more records changed, based on comparing the one or more records with previous records(s).

In another example, application component 1410 can include a fault recovery application that can enable storage related entity 1400 to "repair" one or more portions of data stored in storage medium 1430. The fault recovery application can request storage medium 1430 to transmit one or more records, e.g., bitmap(s), log(s), etc. to storage related entity 1400, and can identify whether one or more portions of data associated with storage block(s) related to the one or more records were "damaged", e.g., by comparing signatures, e.g., hash, etc. of the one or more records with valid signatures associated with data stored in other storage mediums, other locations, etc. corresponding to the one or more portions of the data.

In yet another example, application component 1410 can include an antivirus application that can identify "suspect" data of storage medium 1430 "infected" by malware, etc. The antivirus application can request storage medium 1430 to transmit one or more records, e.g., bitmap(s), log(s), etc. to storage related entity 1400, and can identify whether one or more portions of data associated with storage block(s) related to the one or more records were infected, e.g., by comparing signatures, e.g., hash, etc. of the one or more records with valid signatures associated with data stored in other storage mediums, other locations, etc. corresponding to the one or more portions of the data.

In one aspect, application component 1410 can perform such operations via a cloud computing system. As such, storage related entity 1400 can interface with storage medium 1430 via at least one of the Internet, a network protocol, or one of various communication protocols discussed above. Further, storage related entity 1400 can interface with storage medium 1430 utilizing interface component 1420, which can enable storage medium 1430 to perform one or more functions, e.g., related to the various API(s) discussed above. For example, in one aspect, interface component 1420 can couple storage related entity 1400 with storage medium 1430 based on an API associated with an in-band command set (see above). In another aspect, interface component 1420 can couple storage related entity 1400 with storage medium 1430 based on an API associated with an out-of-band command set (see above).

FIGS. 15-23 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 15:
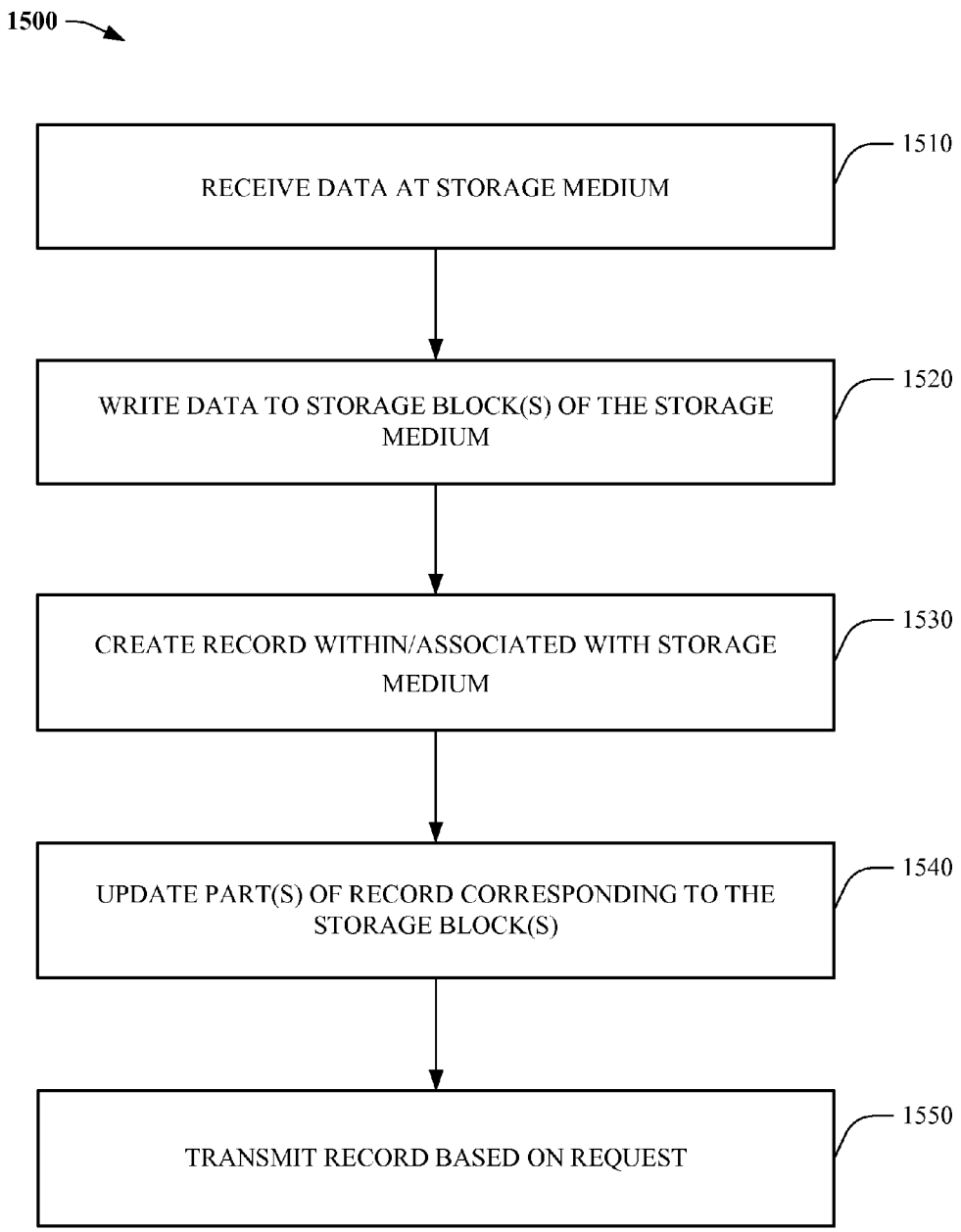
FIGS. 15-19 illustrate various processes associated with one or more storage mediums, in accordance with an embodiment.

Referring now to FIG. 15, a process 1500 associated with a storage medium is illustrated, in accordance with an embodiment. At 1510, data can be received at the storage medium, e.g., 100, 210, 300, 520, 530, 600, 710, 810, 1000, 1300, 1430, etc. via a storage related entity (see above). The storage medium can write, copy, and/or record the data to one or more storage blocks of the storage medium at 1520, e.g., via write component 110 (see above). At 1530, a record can be created within and/or associated with the storage medium, e.g., via signature component 120 (see above). One or more parts of the record corresponding to the one or more storage blocks can be updated at 1540, e.g., via signature component 120 (see above). At 1550, the storage medium can transmit the record, e.g., to the storage related entity, based on a request received from the storage related entity.

Figure 16:
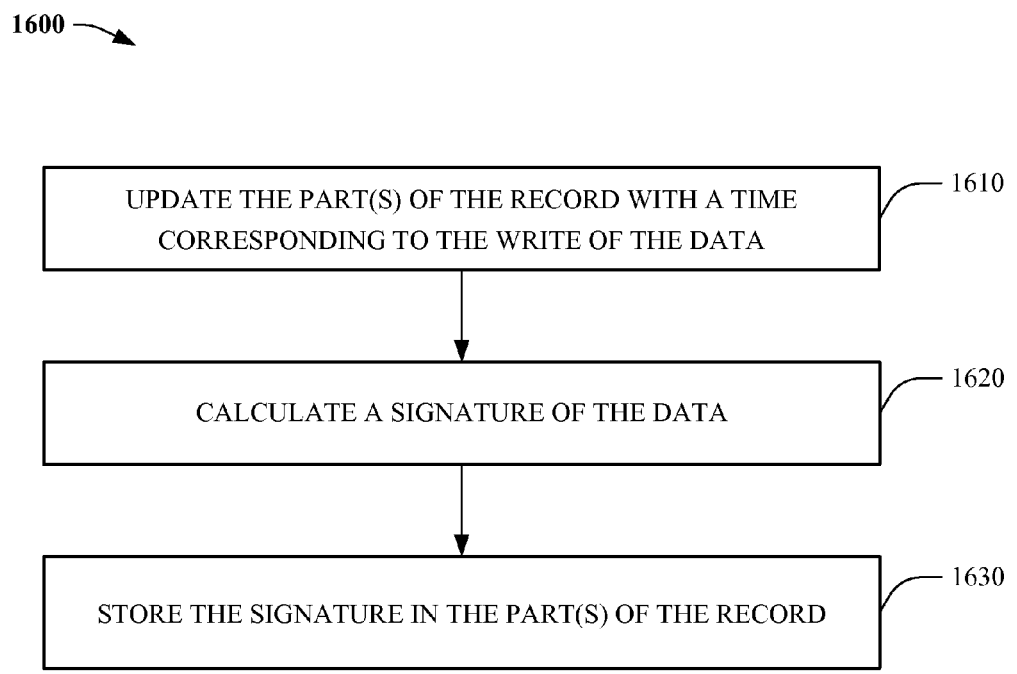

FIG. 16 illustrates another process (1600) associated with a storage medium, in accordance with an embodiment. At 1610, and referencing 1520 and 1540 (see above), one or more parts of the record corresponding to the one or more storage blocks can be updated with a time corresponding to the write, copy, and/or recording of the data, e.g., via time component 610 (see above). Further, a signature of the data can be calculated at 1620, e.g., via signature component 120 (see above). At 1630, the signature can be stored in the one or more parts of the record, e.g., via signature component 120, so as to correspond to the time.

Figure 17:
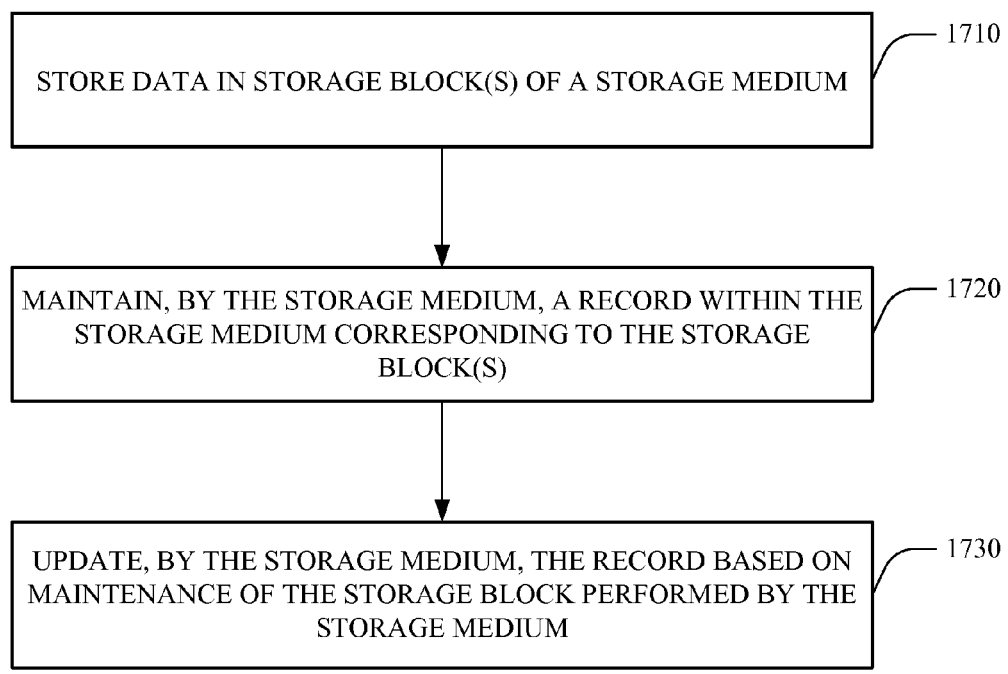

FIG. 17 illustrates yet another process (1700) associated with a storage medium, e.g., 100, 210, 300, 520, 530, 600, 710, 810, 1000, 1300, 1430, etc. in accordance with an embodiment. At 1710, data can be stored in one or more storage blocks of the storage medium, e.g., via write component 110. The storage medium can maintain a record within the storage medium corresponding to the one or more storage blocks at 1720, e.g., via signature component 110. In an aspect, the one or more storage blocks can include one or more bits and/or one or more bytes. At 1730, the storage medium can update the record based on maintenance performed on the record (at 1720) by the storage medium.

Figure 18:
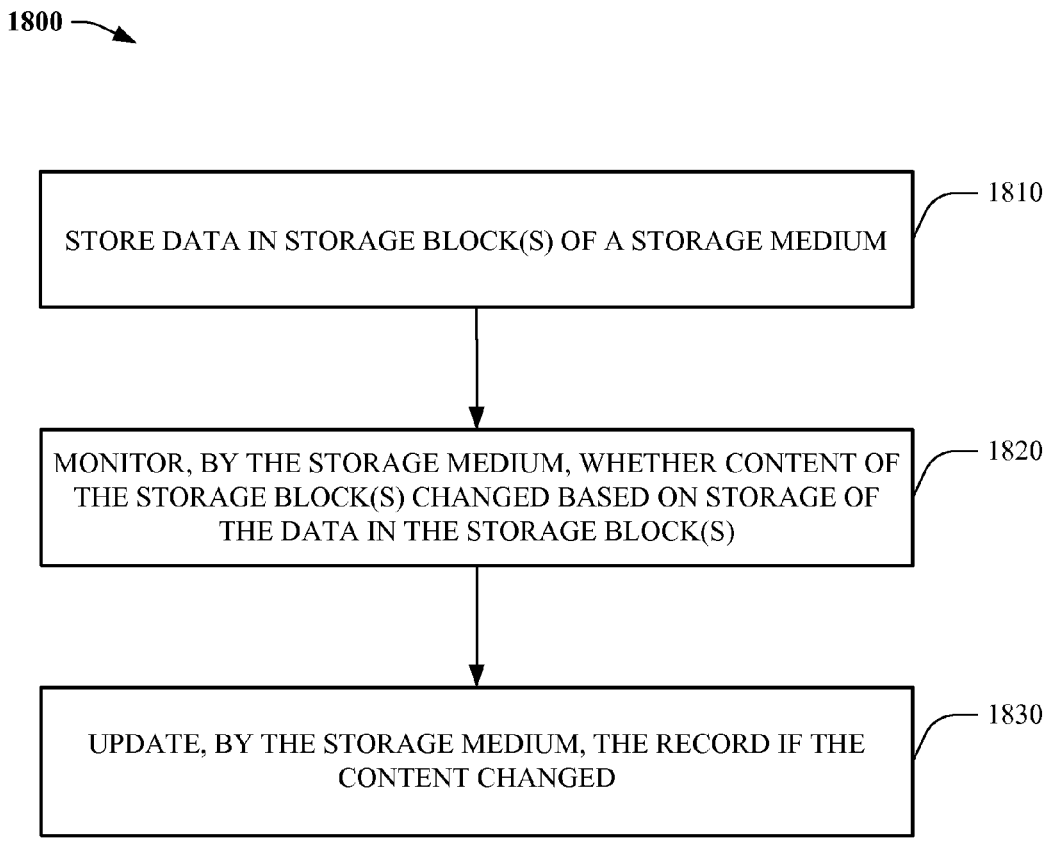

FIG. 18 illustrates a process 1800 for monitoring whether content of storage block(s) of a storage medium, e.g., 100, 210, 300, 520, 530, 600, 710, 810, 1000, 1300, 1430, etc. changed, in accordance with an embodiment. At 1810, data can be stored in one or more storage blocks of the storage medium, e.g., via write component 110. At 1820, the storage medium can monitor, e.g., via a monitor component (see above), whether content of the storage block(s) changed as a function of data stored in the storage block(s). In one aspect, the monitor component can record, e.g., temporarily, "old" data stored in the storage block(s) at one or more other locations before "new" data is written to such storage block(s)—the monitor component can compare the old data with the new data to determine whether content of the storage block(s) changed. At 1830, the storage medium can update the one or more records, e.g., based on whether monitor component determined content of storage block(s) associated with the one or more records changed.

Figure 19:
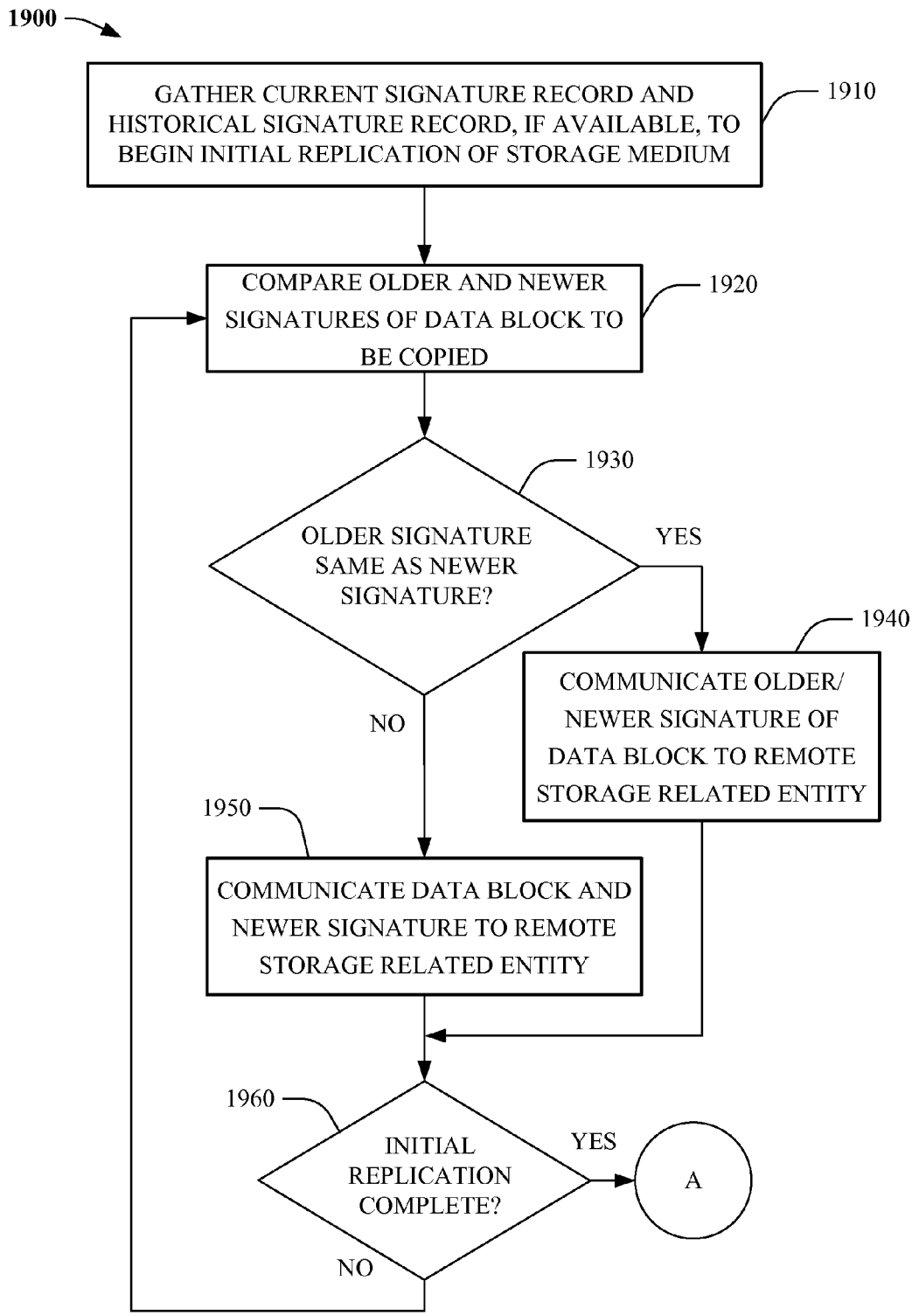
Figure 20:
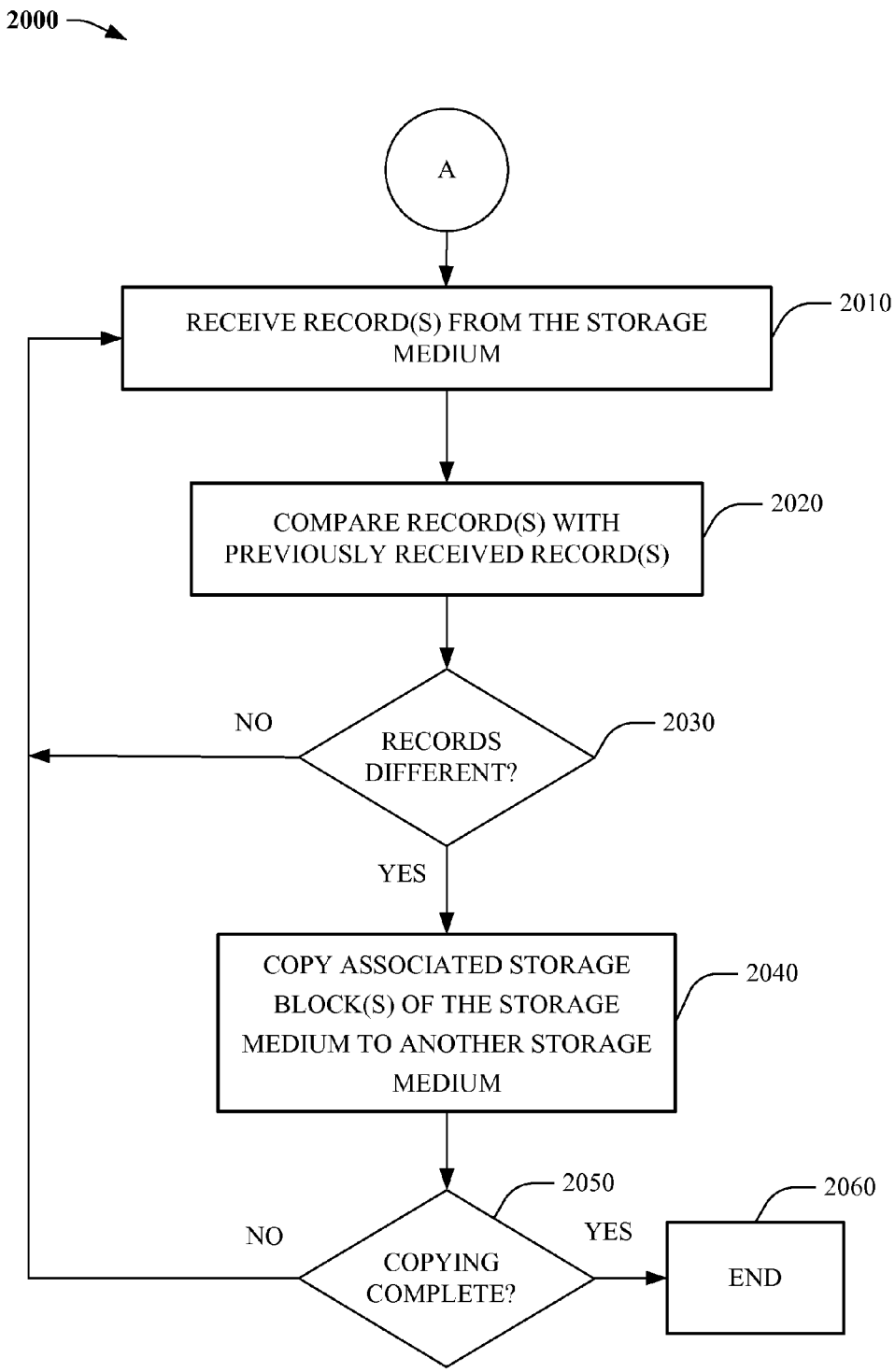
FIGS. 20-23 illustrate various processes associated with one or more storage related entities, in accordance with an embodiment.

Now referring to FIGS. 19 and 20, processes 1900 and 2000 associated with replicating a storage medium, e.g., 100, 210, 300, 520, 530, 600, 710, 810, 1000, 1300, 1430, etc. are illustrated, in accordance with an embodiment. At 1910, a current signature record and a historical signature record associated with the storage medium can be obtained, if available, e.g., to begin initial replication of the storage medium. Signatures, e.g., an older signature of the historical signature record and a newer signature of the current signature record, of data of a storage block to be copied can be compared at 1920. At 1930, it can be determined whether the older signature is the same as the newer signature. If it is determined at 1930 that the older signature is the same as the newer signature, then the storage medium can communicate the older/newer signature to a remote storage related entity, e.g., 410, 420, 510, 1400, etc. at 1940; otherwise, if the newer signature is different than the older signature, then the storage medium can communicate data of the storage block and the newer signature to the remote storage related entity at 1950. As such, the storage medium can preserve valuable communication bandwidth by enabling the remote storage related entity to copy previously received data associated with the newer signature without communicating the data between the storage medium and the remote storage related entity.

Process 1900 can continue from 1940/1950 to 1960, at which it can be determined whether the initial replication of the storage medium is complete. If it is determined that the initial replication is complete, process 1900 can continue to 2010; otherwise process 1900 can continue to 1920 to continue the initial replication of the storage medium. Now referring to FIG. 20, a storage related entity, e.g., 410, 420, 510, 1400, etc. can iteratively receive from the storage medium, e.g., based on request(s) directed to the storage medium, one or more records (see above) associated with storage block(s) of the storage medium at 2010.

At 2020, the storage related entity can compare one or more records received at 2010 with previously received, e.g., stored, record(s). Process 2000 can determine, at 2030, whether the records are different, and proceed to 2040 to recopy storage block(s) associated with differences in the records; else, process 2000 can return to 2010. Process 2000 can continue from 2040 to 2050, at which it can be determined whether copying, e.g., replication, duplication, etc. is complete. If copying is complete, process 2000 can end at 2060, else return to 2010.

Figure 21:
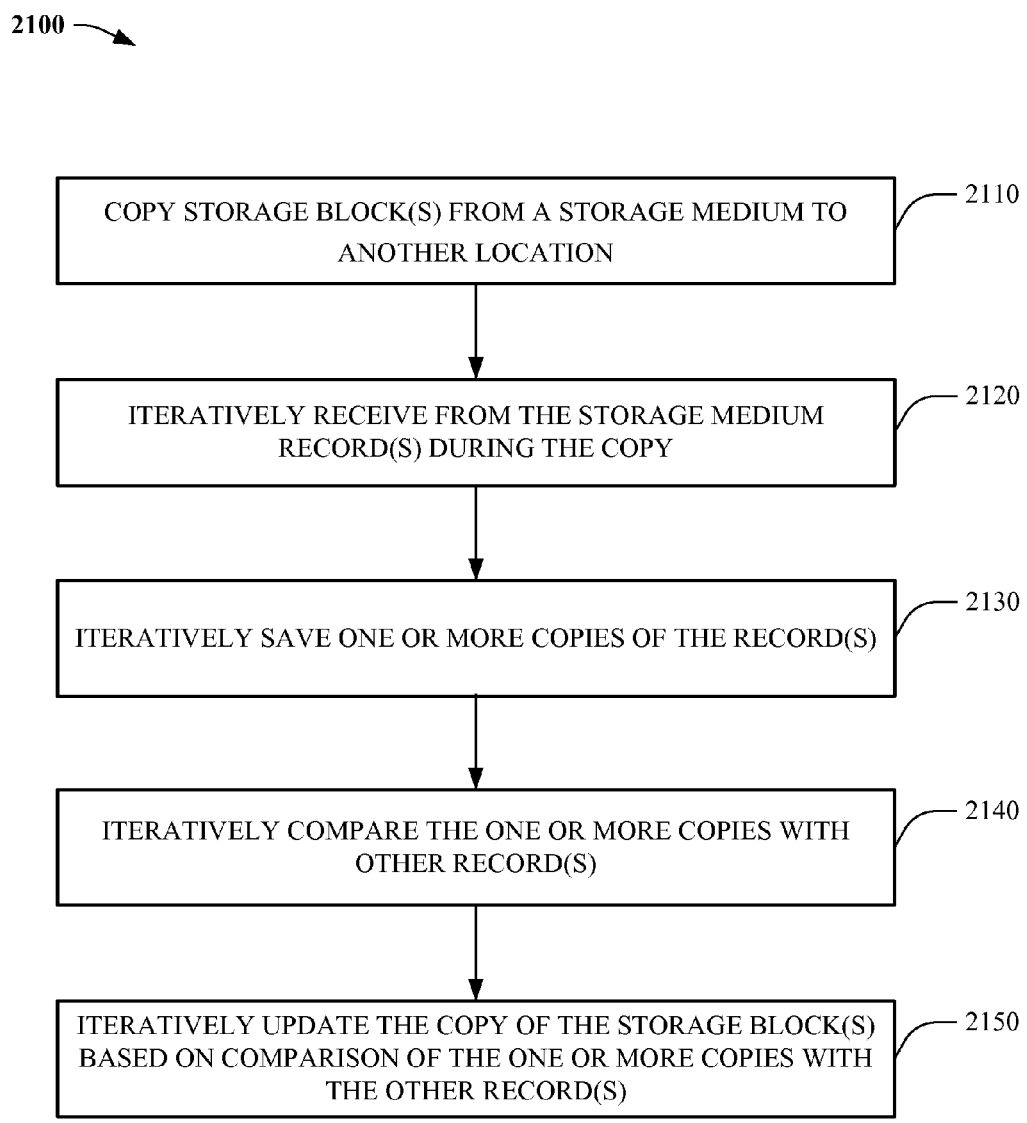

FIG. 21 illustrates another process (2100) associated with a storage related entity, e.g., 410, 420, 510, 1400, etc., in accordance with an embodiment. At 2110, the storage related entity can copy storage block(s) from a storage medium to another location, e.g., storage medium, storage related entity, etc. At 2120, the storage related entity can iteratively receive from the storage medium one or more records during the copying of storage block(s). At 2130, the storage related entity can iteratively save one or more copies of the one or more records, and iteratively compare the one or more copies with other record(s) at 2140. At 2150, the storage related entity can iteratively update copying of the storage blocks based on comparing the one or more copies with the other record(s).

Figure 22:
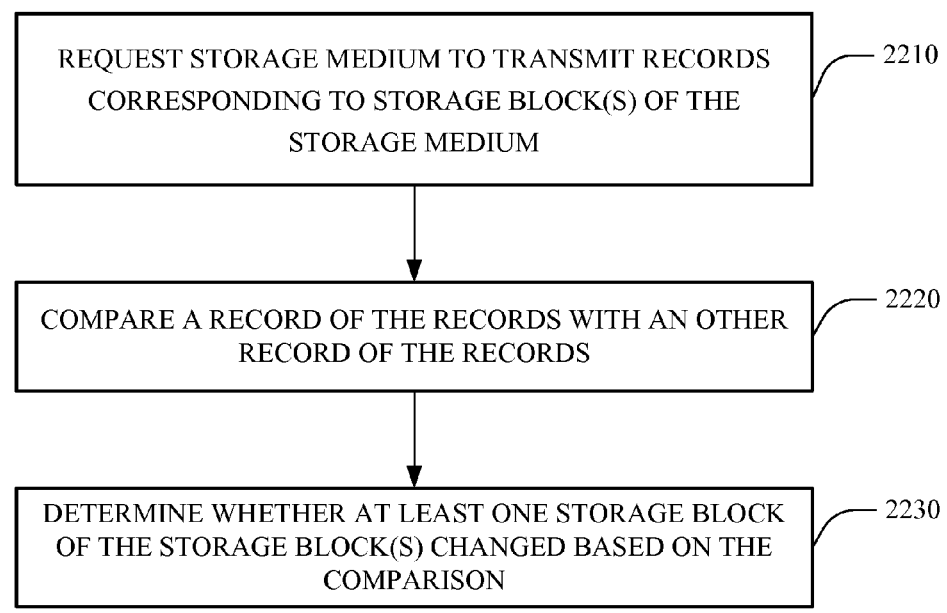

FIG. 22 illustrates yet another process (2200) associated with a storage related entity, e.g., 410, 420, 510, 1400, etc., in accordance with an embodiment. At 2210, the storage related entity can request, e.g., via application component 1410, a storage medium, e.g., 100, 210, 300, 520, 530, 600, 710, 800, 900, 1000, 1100, 1430, etc. to transmit records corresponding to one or more storage blocks of the storage medium, e.g., via a communications protocol (see above). The storage related entity can compare a record of the records with an other record of the records at 2220. At 2230, the storage related entity can determine whether at least one storage block of the one or more storage blocks changed based on the comparison. In an aspect, the storage related entity can interface with the storage medium, e.g., via interface component 1420, via at least one of an in-band command set (see above) associated with the communications protocol or an out-of-band command set (see above) associated with the communications protocol.

Figure 23:
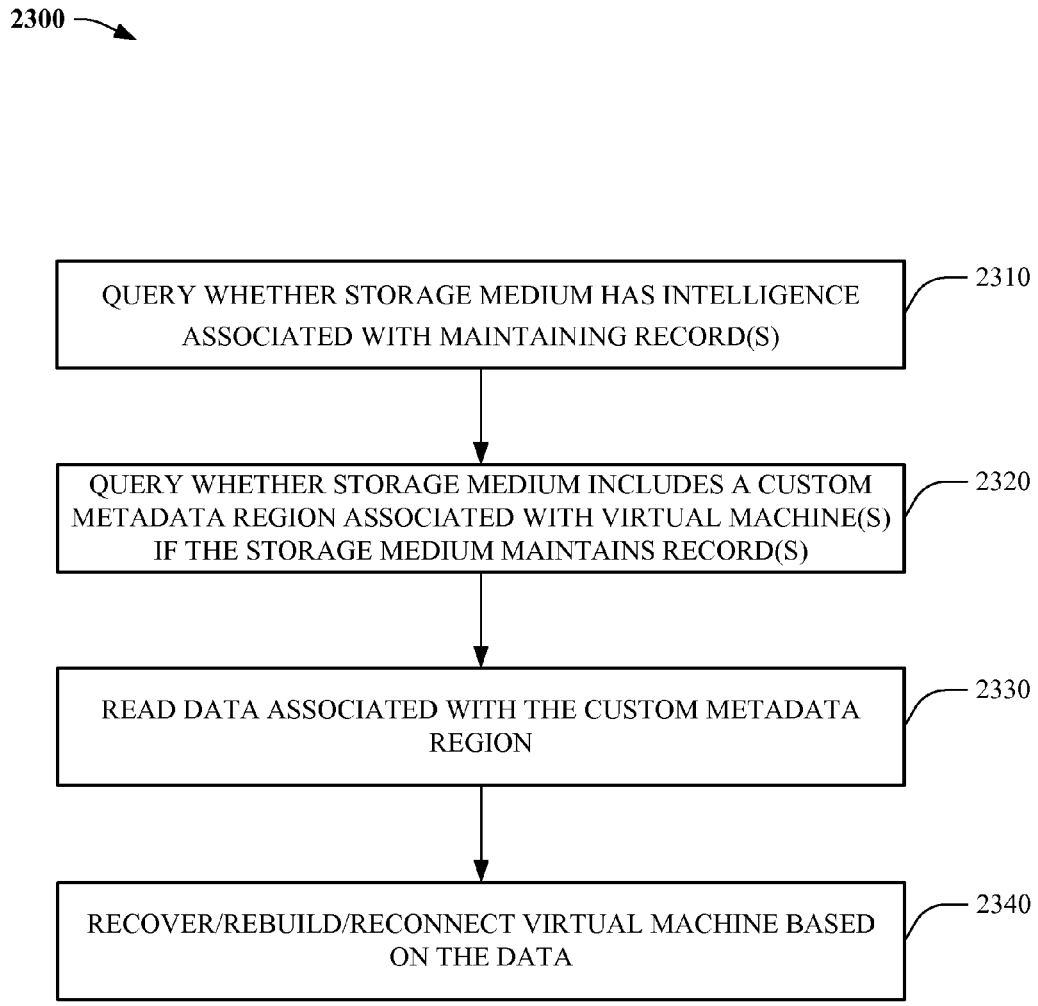

FIG. 23 illustrates a process 2300 associated with a virtual machine, in accordance with an embodiment. At 2310, a storage related entity can query whether a storage medium has intelligence associated with maintaining records, e.g., whether the storage medium maintains one or more records associated with storage blocks of the storage medium. At 2320, the storage related entity can query whether the storage medium includes a custom metadata region associated with one or more virtual machines if the storage medium maintains the one or more records. At 2330, the storage related entity can read data and/or information from the metadata region. Further, the storage related entity can recover, rebuild, and/or reconnect the virtual machine associated with the custom metadata region based on the data and/or the information at 2340. In an aspect, a format for metadata, data, and/or the information can include an Open Virtualization Format (OVF) associated with virtual machine(s).

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in storage systems described above, non-volatile memory 2422 (see below), disk storage 2424 (see below), and memory storage 2446 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 24:
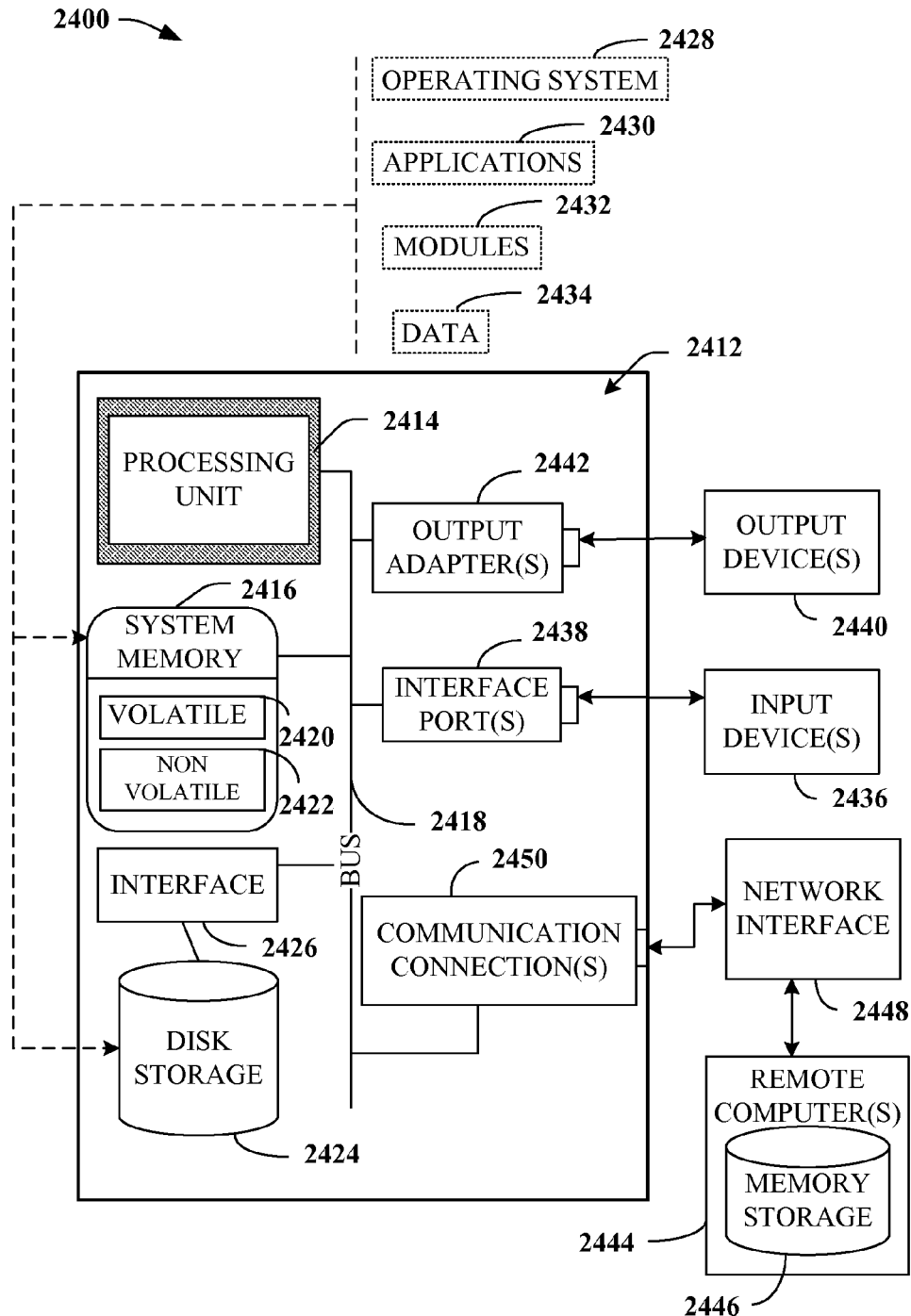
FIG. 24 illustrates a block diagram of a computing system operable to execute the disclosed systems and methods, in accordance with an embodiment.

In order to provide a context for the various aspects of the disclosed subject matter, FIG. 24, and the following discussion, are intended to provide a brief, general description of a suitable environment in which the various aspects of the disclosed subject matter can be implemented, e.g., various processes associated with FIGS. 1-23. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 24, a block diagram of a computing system 2400 operable to execute the disclosed systems and methods is illustrated, in accordance with an embodiment. Computer 2412 includes a processing unit 2414, a system memory 2416, and a system bus 2418. System bus 2418 couples system components including, but not limited to, system memory 2416 to processing unit 2414. Processing unit 2414 can be any of various available processors. Dual microprocessors and other multiprocessor architectures also can be employed as processing unit 2414.

System bus 2418 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1194), and Small Computer Systems Interface (SCSI).

System memory 2416 includes volatile memory 2420 and nonvolatile memory 2422. A basic input/output system (BIOS), containing routines to transfer information between elements within computer 2412, such as during start-up, can be stored in nonvolatile memory 2422. By way of illustration, and not limitation, nonvolatile memory 2422 can include ROM, PROM, EPROM, EEPROM, or flash memory. Volatile memory 2420 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2412 can also include removable/non-removable, volatile/non-volatile computer storage media, networked attached storage (NAS), e.g., SAN storage, etc. FIG. 24 illustrates, for example, disk storage 2424. Disk storage 2424 includes, but is not limited to, devices like a magnetic disk drive, floppy disk drive, tape drive, Jaz drive, Zip drive, LS-100 drive, flash memory card, or memory stick. In addition, disk storage 2424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2424 to system bus 2418, a removable or non-removable interface is typically used, such as interface 2426.

It is to be appreciated that FIG. 24 describes software that acts as an intermediary between users and computer resources described in suitable operating environment 2400. Such software includes an operating system 2428. Operating system 2428, which can be stored on disk storage 2424, acts to control and allocate resources of computer 2412. System applications 2430 take advantage of the management of resources by operating system 2428 through program modules 2432 and program data 2434 stored either in system memory 2416 or on disk storage 2424. It is to be appreciated that the disclosed subject matter can be implemented with various operating systems or combinations of operating systems.

A user can enter commands or information into computer 2412 through input device(s) 2436. Input devices 2436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 2414 through system bus 2418 via interface port(s) 2438. Interface port(s) 2438 include, for example, a serial port, a parallel port, a game port, and a universal serial bus (USB). Output device(s) 2440 use some of the same type of ports as input device(s) 2436.

Thus, for example, a USB port can be used to provide input to computer 2412 and to output information from computer 2412 to an output device 2440. Output adapter 2442 is provided to illustrate that there are some output devices 2440 like monitors, speakers, and printers, among other output devices 2440, which use special adapters. Output adapters 2442 include, by way of illustration and not limitation, video and sound cards that provide means of connection between output device 2440 and system bus 2418. It should be noted that other devices and/or systems of devices provide both input and output capabilities such as remote computer(s) 2444.

Computer 2412 can operate in a networked environment using logical connections to one or more remote computers, such as remote computer(s) 2444. Remote computer(s) 2444 can be a personal computer, a server, a router, a network PC, a workstation, a microprocessor based appliance, a peer device, or other common network node and the like, and typically includes many or all of the elements described relative to computer 2412.

For purposes of brevity, only a memory storage device 2446 is illustrated with remote computer(s) 2444. Remote computer(s) 2444 is logically connected to computer 2412 through a network interface 2448 and then physically connected via communication connection 2450. Network interface 2448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2450 refer(s) to hardware/software employed to connect network interface 2448 to bus 2418. While communication connection 2450 is shown for illustrative clarity inside computer 2412, it can also be external to computer 2412. The hardware/software for connection to network interface 2448 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A storage medium, comprising:
   a plurality of storage blocks;
   a memory to store instructions; and
   a processor, coupled to the memory, that executes or facilitates execution of the instructions to at least:
      receive, from a client application of a plurality of client applications, a request comprising an application programming interface (API) command for creating a hash map of one or more block hash signatures within the storage medium;
      in response to receiving a write request directed to the storage medium, determine one or more hash signatures;
      update, based on the one or more hash signatures, a plurality of application hash maps that were previously created via the API and maintained within the storage medium for the plurality of client applications; and
      receive, from the client application, a hash map request for the hash map.

2. The storage medium of claim 1, wherein write requests comprising the write request directed to the storage medium correspond to updates to the plurality of application hash maps maintained within the storage medium.

3. The storage medium of claim 2, wherein the processor further executes or facilitates the execution of the instructions to update at least one part of a record of the storage medium, wherein the record is a bitmap, and wherein the at least one part of the record comprises one or more bits of the bitmap.

4. The storage medium of claim 2, wherein the processor further executes or facilitates the execution of the instructions to:
   update at least one part of a record of the storage medium; and
   store a hash signature of the one or more hash signatures in the at least one part of the record.

5. The storage medium of claim 2, wherein the processor further executes or facilitates the execution of the instructions to update at least one part of a record of the storage medium, and wherein the at least one part of the record has been updated with a time corresponding to storage of the hash map in the plurality of storage blocks.

6. The storage medium of claim 5, wherein the at least one part of the record has been updated with the time in response to a determination that the one or more hash signatures do not satisfy a defined similarity to a hash signature of the plurality of application hash maps.

7. The storage medium of claim 5, wherein the record is a log, and wherein the at least one part of the record associates a storage block of the plurality of storage blocks with the time.

8. The storage medium of claim 2, wherein the processor further executes or facilitates the execution of the instructions to:
   update at least one part of a record of the storage medium;
   receive a record request; and
   send the record based on the record request.

9. The storage medium of claim 2, wherein the processor further executes or facilitates the execution of the instructions to modify a first bit of consecutive bits of a record in response to storage of the hash map, wherein the first bit represents a storage block of the plurality of storage blocks, and wherein a second bit of the consecutive bits represents another storage block of the plurality of storage blocks.

10. The storage medium of claim 9, wherein the processor further executes or facilitates the execution of the instructions to send the record in response to a further determination that a record request for the record was received.

11. The storage medium of claim 1, wherein the processor further executes or facilitates the execution of the instructions to:
receive an attribute request; and
send one or more attributes of the storage medium based on the attribute request.

12. The storage medium of claim 11, wherein the one or more attributes comprise information that identifies at least one of: a size of a storage block of the plurality of storage blocks, one or more hash algorithms utilized by the storage medium, a maximum hash digest length, a minimum hash digest length, a version of the one or more hash algorithms, a property of a record of the storage medium, a size of the record, a data block size associated with the record, a hash key for the storage block, a record portion of the record based on a specified range of the record, a portion of the plurality of storage blocks based on a specified range of the plurality of storage blocks, or whether the storage medium supports a map.

13. The storage medium of claim 1, wherein the processor further executes or facilitates the execution of the instructions to at least one of send or receive information based on an in-band command set associated with at least one of a small computer system interface (SCSI) protocol, an Internet SCSI (iSCSI) protocol, a fibre channel (FC) protocol, a SCSI over FC protocol, a serial storage architecture protocol, an advanced technology (AT)-attachment interface (ATA) protocol, an ATA over ethernet (AoE) protocol, or a storage area network protocol.

14. The storage medium of claim 1, wherein the processor further executes or facilitates the execution of the instructions to:
receive a configuration request; and
change a configuration of the storage medium based on the configuration request.

15. The storage medium of claim 1, wherein the processor further executes or facilitates the execution of the instructions to:
determine whether a first signature of the one or more hash signatures that is associated with a first block of the plurality of storage blocks satisfies a defined similarity to a second signature of the one or more hash signatures that is associated with a second block of the plurality of storage blocks; and
in response to a determination that the first signature satisfies the defined similarity to the second signature, associate the first block with the second block using a pointer.

16. The storage medium of claim 15, wherein the processor further executes or facilitates the execution of the instructions to:
store the pointer in the storage medium; and
identify information that was stored in the second block using the pointer.

17. A method, comprising:
receiving, by a system comprising a processor and a storage medium, a request from a client application of a plurality of client applications, wherein the request comprises an application programming interface (API) command directing the system to create a hash map of one or more block hash signatures in the storage medium;
in response to receiving a write request directed to the system, determining, by the system, a hash signature;
based on the hash signature, updating, by the system, application hash maps that were previously created via the API and maintained on the storage medium for the plurality of client applications; and
receiving, by the system from the client application, a hash map request for the hash map.

18. The method of claim 17, further comprising:
updating, by the system, a record stored in the storage medium.

19. The method of claim 18, further comprising:
storing, by the system, the hash signature in the record.

20. The method of claim 18, further comprising:
receiving, by the system, a record request; and
sending, by the system based on the record request, the record.

21. A non-transitory computer-readable storage device comprising computer-executable instructions that, in response to execution, cause a system comprising a processor and a storage block to perform operations, comprising:
receiving a request comprising an application programming interface (API) command from a client application of a plurality of client applications to create a hash map of one or more block signatures in the storage block;
in response to receiving a write request, determining a hash signature;
updating, based on the hash signature, application hash maps that were previously created via the API and maintained on the storage block for the plurality of client applications; and
receiving, from the client application, a hash map request for the hash map.

22. The non-transitory computer-readable storage device of claim 21, wherein the operations further comprise:
modifying a record stored in the storage block.

23. The non-transitory computer-readable storage device of claim 22, wherein the operations further comprise:
receiving a record request; and
sending the record based on the record request.

24. The non-transitory computer-readable storage device of claim 22, wherein the operations further comprise:
storing the hash signature in the record.

* * * * *